US012794887B2

(12) United States Patent
Chen et al.

(10) Patent No.: US 12,794,887 B2
(45) Date of Patent: Nov. 10, 2026

(54) RE-AUTHENTICATION AUTHORIZATION METHOD/APPARATUS/DEVICE FOR AI NETWORK FUNCTION, AND STORAGE MEDIUM

(71) Applicant: BEIJING XIAOMI MOBILE SOFTWARE CO., LTD., Beijing (CN)

(72) Inventors: Dong Chen, Beijing (CN); Zhibin He, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 40 days.

(21) Appl. No.: 18/868,701

(22) PCT Filed: May 24, 2022

(86) PCT No.: PCT/CN2022/094806

§ 371 (c)(1),
(2) Date: Nov. 22, 2024

(87) PCT Pub. No.: WO2023/225878

PCT Pub. Date: Nov. 30, 2023

(65) Prior Publication Data

US 2025/0358285 A1 Nov. 20, 2025

(51) Int. Cl.

| | |
|---|---|
| ***H04L 9/40*** | (2022.01) |
| ***H04L 41/082*** | (2022.01) |
| ***H04L 41/16*** | (2022.01) |

(52) U.S. Cl.

CPC ........ *H04L 63/0892* (2013.01); *H04L 41/082* (2013.01); *H04L 41/16* (2013.01)

(58) Field of Classification Search

None

See application file for complete search history.

(56) References Cited

U.S. PATENT DOCUMENTS

| | | | | |
|---|---|---|---|---|
| 12,124,592 | B1 * | 10/2024 | O'Hern | G06F 21/577 |
| 2022/0116816 | A1 * | 4/2022 | Liang | H04L 47/24 |

(Continued)

FOREIGN PATENT DOCUMENTS

| | | | |
|---|---|---|---|
| CN | 114270931 | A | 4/2022 |
| CN | 114301788 | A | 4/2022 |

(Continued)

OTHER PUBLICATIONS

International Search Report issued in Application No. PCT/CN2022/094806 dated Nov. 11, 2022 with English translation, (6p).

(Continued)

*Primary Examiner* — Sanchit K Sarker
(74) *Attorney, Agent, or Firm* — Arch & Lake LLP; Hao Tan; Shen Wang

(57) ABSTRACT

A re-authentication-authorization method is performed by a network slice-specific authentication and authorization function (NSSAAF) network element and includes: receiving a re-authentication-authorization request sent by an authentication and authorization server (AAA-S) network element, where the re-authentication-authorization request includes AI function selection assistance information (AIFSAI) and a first identifier used for identifying a user equipment (UE) served by the AI network function; and performing re-authentication-authorization on the AI network function based on the AIFSAI and the first identifier.

13 Claims, 10 Drawing Sheets

(56) References Cited

U.S. PATENT DOCUMENTS

| | | | | |
|---|---|---|---|---|
| 2023/0067830 A1* | 3/2023 | Tiwari | .................. | H04W 48/12 |
| 2023/0144435 A1* | 5/2023 | Hou | ...................... | H04W 12/06 726/4 |

FOREIGN PATENT DOCUMENTS

| | | | | |
|---|---|---|---|---|
| WO | WO-2019108631 A1 * | 6/2019 | ............... | G06N 3/09 |
| WO | 2021089703 A1 | 5/2021 | | |
| WO | 2021133092 A1 | 7/2021 | | |

OTHER PUBLICATIONS

Huawei et al., "Sending NSSAI to AAA," 3GPP TSG-SA3, Meeting #99e, S3-201154, e-meeting, May 11-15, 2020, (9p).

* cited by examiner

RE-AUTHENTICATION AUTHORIZATION METHOD/APPARATUS/DEVICE FOR AI NETWORK FUNCTION, AND STORAGE MEDIUM

CROSS REFERENCE TO RELATED APPLICATION

This application is the U.S. national phase of PCT Application No. PCT/CN2022/094806, filed on May 24, 2022, which is incorporated by reference herein in by reference in its entirety for all purposes.

TECHNICAL FIELD

This disclosure relates to the field of communication technology, and in particular to a re-authentication-authorization method/apparatus/device and a storage medium for AI network function.

BACKGROUND

In the 5G system, by introducing AI (Artificial Intelligence) network function technology, a higher level of autonomy can be achieved at the network by using the AI network function, thereby reducing costs and enhancing intelligent effects. Herein, after initial registration is established for the AI network function, it may need to be re-authenticated and authorized (for example, the AI network function may need to be re-authenticated and authorized every time it is regularly checked). Therefore, there is an urgent need for a re-authentication-authorization method for the AI network function.

SUMMARY

Re-authentication-authorization method/apparatus/device and storage medium for AI network function are proposed by this disclosure and used for re-authentication-authorization of the AI network function.

In a first aspect, this disclosure provides a re-authentication-authorization method, which is performed by a network slice-specific authentication and authorization function (NSSAAF) network element and includes:

- receiving a re-authentication-authorization request sent by an authentication and authorization server (AAA-S) network element, where the re-authentication-authorization request includes AI function selection assistance information (AIFSAI) and a first identifier used for identifying a user equipment (UE) served by the AI network function; and
- performing re-authentication-authorization on the AI network function based on the AIFSAI and the first identifier.

This disclosure provides a re-authentication-authorization method for AI network function(s), which can be used to perform re-authentication-authorization on AI network function(s), thereby ensuring the security of AI network function (s) and enabling AI network function(s) to provide safe and stable service for UEs.

In a second aspect, this disclosure provides a re-authentication-authorization method, which is performed by an AAA-S network element and includes:

- sending a re-authentication-authorization request to an NSSAAF network element, where the re-authentication-authorization request includes AIFSAI and a first identifier used for identifying UE served by the AI network function.

In a third aspect, this disclosure provides a re-authentication-authorization method, which is performed by UDM and includes:

- receiving a query request sent by an NSSAAF network element, where the query request includes AIFSAI and a first identifier used for identifying UE served by the AI network function; and
- performing a query based on the AIFSAI and the first identifier, and sending a query result to the NSSAAF network element.

In a fourth aspect, this disclosure provides a re-authentication-authorization method, which is performed by AMF and includes:

- receiving a re-authentication-authorization message sent by an NSSAAF network element, where the re-authentication-authorization message is indicative of that the NSSAAF performs re-authentication-authorization on the AI network function.

In a fifth aspect, this disclosure provide a re-authentication-authorization method, which is performed by UE and includes:

- receiving a re-authentication-authorization message, where the re-authentication-authorization message is indicative of that an NSSAAF performs re-authentication-authorization on the AI network function.

In a sixth aspect, this disclosure provides a communication device, which is provided in an NSSAAF network element and includes:

- a transceiving module, configured to receive a re-authentication-authorization request sent by an AAA-S network element, where the re-authentication-authorization request includes AIFSAI and a first identifier used for identifying UE served by the AI network function; and
- a processing module, configured to perform re-authentication-authorization on the AI network function based on the AIFSAI and the first identifier.

In a seventh aspect, this disclosure provides a communication device, which is provided in an AAA-S network element and includes:

- a transceiving module, configured to send a re-authentication-authorization request to an NSSAAF network element, where the re-authentication-authorization request includes AIFSAI and a first identifier used for identifying UE served by the AI network function.

In an eighth aspect, this disclosure provides a communication device provided in UDM, including:

- a transceiving module, configured to receive a query request sent by an NSSAAF network element, where the query request includes AIFSAI and a first identifier used for identifying UE served by the AI network function; and
- a processing module, configured to perform a query based on the AIFSAI and the first identifier, and sending a query result to the NSSAAF network element.

In a ninth aspect, this disclosure provides a communication device provided in an AMF, including:

- a transceiving module, configured to receive a re-authentication-authorization message sent by an NSSAAF network element, where the re-authentication-authorization message is indicative of that the NSSAAF performs re-authentication-authorization on the AI network function.

In a tenth aspect, this disclosure provides a communication device, which is provided in UE and includes:

a transceiving module, configured to receive a re-authentication-authorization message, where the re-authentication-authorization message is indicative of that an NSSAAF performs re-authentication-authorization on the AI network function.

In an eleventh aspect, this disclosure provides a communication device including a processor, where the processor, upon calling a computer program in a memory, is configured to implement the method according to the first aspect as described above.

In a twelfth aspect, this disclosure provides a communication device including a processor, where the processor, upon calling a computer program in a memory, is configured to implement the method according to the second aspect as described above.

In a thirteen aspect, this disclosure provides a communication device including a processor, where the processor, upon calling a computer program in a memory, is configured to implement the method according to the third aspect as described above.

In a fourteen aspect, this disclosure provides a communication device including a processor, where the processor, upon calling a computer program in a memory, is configured to implement the method according to the fourth aspect as described above.

In a fifteen aspect, this disclosure provides a communication device including a processor, where the processor, upon calling a computer program in a memory, is configured to implement the method according to the fifth aspect as described above.

In a sixteenth aspect, this disclosure provides a communication device including a processor and a memory, where the memory stores a computer program therein, and the processor is configured to execute the computer program stored in the memory, thereby causing the communication device to perform the method according to the first aspect as described above.

In a seventeenth aspect, this disclosure provides a communication device including a processor and a memory, where the memory stores a computer program therein, and the processor is configured to execute the computer program stored in the memory, thereby causing the communication device to perform the method according to the second aspect as described above.

In an eighteenth aspect, this disclosure provides a communication device including a processor and a memory, where the memory stores a computer program therein, and the processor is configured to execute the computer program stored in the memory, thereby causing the communication device to perform the method according to the third aspect as described above.

In a nineteenth aspect, this disclosure provides a communication device including a processor and a memory, where the memory stores a computer program therein, and the processor is configured to execute the computer program stored in the memory, thereby causing the communication device to perform the method according to the fourth aspect as described above.

In a twentieth aspect, this disclosure provides a communication device including a processor and a memory, where the memory stores a computer program therein, and the processor is configured to execute the computer program stored in the memory, thereby causing the communication device to perform the method according to the fifth aspect as described above.

In a twenty-first aspect, this disclosure provides a communication device including a processor and an interface circuit, where the interface circuit is configured to receive code instructions and transmit the code instructions to the processor, and the processor is configured to run the code instructions, thereby causing the device to perform the method according to the first aspect as described above.

In a twenty-second aspect, this disclosure provides a communication device including a processor and an interface circuit, where the interface circuit is configured to receive code instructions and transmit the code instructions to the processor, and the processor is configured to run the code instructions, thereby causing the device to perform the method according to the second aspect as described above.

In a twenty-third aspect, this disclosure provides a communication device including a processor and an interface circuit, where the interface circuit is configured to receive code instructions and transmit the code instructions to the processor, and the processor is configured to run the code instructions, thereby causing the device to perform the method according to the third aspect as described above.

In a twenty-fourth aspect, this disclosure provides a communication device including a processor and an interface circuit, where the interface circuit is configured to receive code instructions and transmit the code instructions to the processor, and the processor is configured to run the code instructions, thereby causing the device to perform the method according to the fourth aspect as described above.

In a twenty-fifth aspect, this disclosure provides a communication device including a processor and an interface circuit, where the interface circuit is configured to receive code instructions and transmit the code instructions to the processor, and the processor is configured to run the code instructions, thereby causing the device to perform the method according to the fifth aspect as described above.

In a twenty-sixth aspect, this disclosure provides a communication system, which includes the communication devices according to the sixth to tenth aspects as described above, or includes the communication devices according to the eleventh to fifteenth aspects as described above, or includes the communication devices according to the sixteenth to twentieth aspects as described above, or includes the communication devices according to the twenty-first to twenty-fifth aspects as described above.

In a twenty-seventh aspect, this disclosure provides a computer-readable storage medium for storing instructions used by the network device as described above, where the instructions, upon being executed, cause a terminal device to perform the method according to any one of the first to fifth aspects as described above.

In a twenty-eighth aspect, this disclosure further provides a computer program product including a computer program, where the computer program, upon being run on a computer, causes the computer to perform the method according to any one of the first to fifth aspects as described above.

In a twenty-ninth aspect, this disclosure provides a chip system. The chip system includes at least one processor and an interface, and is configured to support a network device to implement the functions involved in the method according to any one of the first to fifth aspects as described above, for example, to determine or process at least one of data and information involved in the forgoing method. In a possible implementation, the chip system further includes a memory, which is configured to store necessary computer program(s) and data of the source and secondary node(s). The chip system may be composed of chips, or may include chips and other discrete devices.

In a thirtieth aspect, this disclosure provides a computer program that, upon being run on a computer, causes the computer to perform the method according to any one of the first to fifth aspects as described above.

BRIEF DESCRIPTION OF THE DRAWINGS

The above and/or additional aspects and advantages of this disclosure will become apparent and readily understood from the following description of the examples in conjunction with the accompanying drawings, in which.

DETAILED DESCRIPTION

Figure 1:
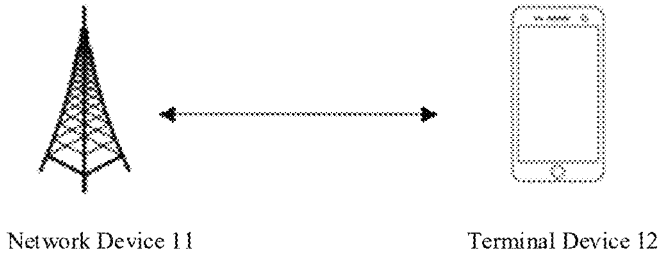
FIG. 1 is a schematic architectural diagram of a communication system according to one or more examples of this disclosure.

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with embodiments of this disclosure. Rather, they are merely examples of apparatuses and methods consistent with some aspects of embodiments of this disclosure.

The terminology used in the embodiments of this disclosure is for the purpose of describing specific embodiments only and is not intended to limit the embodiments of this disclosure. As used in the embodiments of this disclosure and the appended claims, the singular forms “a”, “an” and “the” are intended to include the plural forms as well, unless the context clearly dictates otherwise. It will also be understood that the term “and/or” as used herein refers to and includes any and all possible combinations of one or more of the associated listed items.

It should be understood that although the terms “first”, “second”, “third”, etc. may be used to describe various information in the embodiments of this disclosure, the information should not be limited to these terms. These terms are only used to distinguish information of the same type from each other. For example, without departing from the scope of the embodiments of this disclosure, the first information may also be called second information, and similarly, the second information may also be called first information. Depending on the context, the word “if” as used herein may be interpreted as “when” or “while” or “in response to determining that . . . ”

Embodiments of this disclosure are described in detail below, examples of which are illustrated in the accompanying drawings, wherein the same or similar reference numerals refer to the same or similar elements throughout. The embodiments described below with reference to the accompanying drawings are exemplary and intended to explain this disclosure and are not to be construed as limitations of this disclosure.

To facilitate understanding, the terminology involved in this application is first introduced.

1. Artificial Intelligence (AI)

AI is a new technical science that studies and develops theories, methods, technologies and application systems for simulating, extending and expanding human intelligence.

2. 6th Generation Mobile Networks (6G)

The 6G network is a fully connected world integrating terrestrial wireless and satellite communications. By integrating satellite communications into 6G mobile communications, seamless global coverage is achieved, and network signals can reach any remote village. In addition, with the joint support of the global satellite positioning system, telecommunications satellite system, earth image satellite system and 6G terrestrial network, the full coverage network of ground and air can also help humans predict weather and quickly respond to natural disasters.

3. Access and Mobility Management Function (AMF) Network Element

AMF network element performs registration, connection, reachability, and mobility management. It provides a session management message transmission channel for terminal device and SMF (Session Management Function) network elements, and provides authentication and authentication functions for terminal device when accessing; it is the access point for terminal device and the wireless core network control plane.

4. Authentication and Authorization Server (AAA-S) Network Element

AAA-S network element is used for authentication and authorization processing on AI functions and the like.

5. Network Slice-Specific Authentication and Authorization Function (NSSAAF)

NSSAAF network element is used for the PLMN (Public Land Mobile Network) to perform authentication and authorization of a specific network slice(s) on S-NSSAI (Single Network Slice Selection Assistance Information) of HPLMN (Home Public Land Mobile Network) based on the subscription information.

6. Unified Data Management (UDM)

UDM is used for the management of user identity, contract data, authentication data, and user service network element registration management.

The various network elements/functions involved in the examples of this disclosure can be either an independent hardware device or a function implemented by computer codes within the hardware device, which is not limited in the examples of this disclosure.

In order to better understand a method for determining the transmission configuration indication status disclosed in the examples of this disclosure, the communication system to which some examples of this disclosure are applicable is first described below.

Referring to FIG. 1, which is a schematic architectural diagram of a communication system according to some examples of this disclosure. The communication system may include but is not limited to one network device and one terminal device. The number and form of devices shown in FIG. 1 are only for examples and do not constitute a limitation on the examples of this disclosure. In actual applications, two or more network devices, and two or more terminal devices, may be included. The communication system shown in FIG. 1 includes one network device 11 and one terminal device 12 as an example.

It should be noted that the technical solutions according to some examples of this disclosure can be applied to various communication systems. For example: long term evolution (LTE) system, 5th generation (5G) mobile communication system, 5G new radio (NR) system, or other future-evolved mobile communication systems.

The network device 11 according to some examples of this disclosure is an entity on the network side that is configured to transmit or receive signals. For example, the network device 11 may be an evolved NodeB (eNB), a transmission reception point (TRP), a next generation NodeB (gNB) in the NR system, other base stations in future-evolved mobile communication systems, access nodes in wireless fidelity (WiFi) systems, or the like. The examples of this disclosure do not limit the specific technologies and specific equipment forms used by the network device. The network device according to some examples of this disclosure may be composed of a centralized unit (CU) and a distributed unit (DU). The CU may also be called a control unit. The CU-DU structure can separate the protocol layers of network device (e.g., base station), with some protocol layer functions being centrally controlled on the CU, and a part or all of remaining protocol layer functions being distributed at the DU(s), where the DU(s) are centrally controlled by the CU.

The terminal device 12 according to some examples of this disclosure is an entity on the user side for receiving or transmitting signals, such as a mobile phone. The terminal device can also be called terminal, user equipment (UE), mobile station (MS), mobile terminal (MT), or the like. The terminal device can be a car with communication functions, a smart car, a mobile phone, a wearable device, a tablet computer (Pad), a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, or the like. Examples of this disclosure do not limit the specific technology and specific device form used by the terminal device.

It can be understood that the communication system described in the examples of this disclosure is to more clearly illustrate the technical solutions according to some examples of this disclosure, and does not constitute a limitation on the technical solutions according to the examples of this disclosure. As those of ordinary skill in the art will know, with the evolution of system architecture and the emergence of new business scenarios, the technical solutions according to some examples of this disclosure are also applicable to similar technical problems.

The re-authentication-authorization method/apparatus/device and storage medium for the AI network function according to some examples of this disclosure will be described in detail below with reference to the accompanying drawings.

Figure 2:
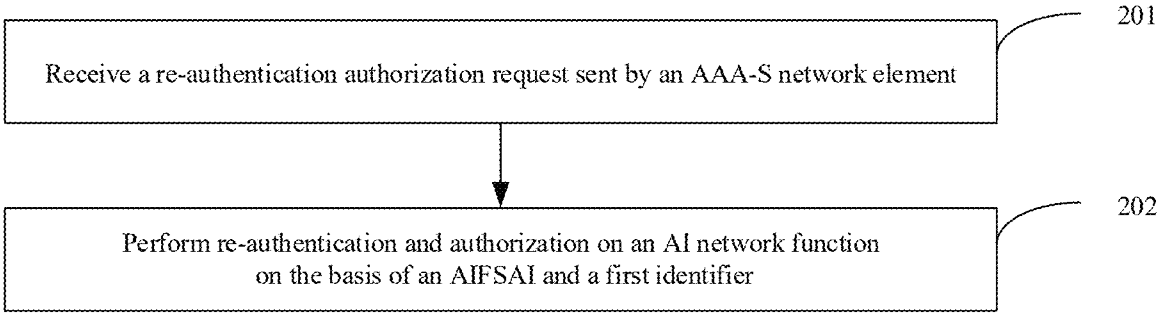
FIG. 2 is a schematic flowchart of a re-authentication-authorization method for AI network function(s) according to one or more examples of this disclosure.

FIG. 2 is a schematic flow chart of a re-authentication-authorization method for AI network function(s) according to some embodiments of this disclosure. The method is performed by the NSSAAF network element. As shown in FIG. 2, the re-authentication-authorization method for AI network function(s) may include the following steps.

In step 201, a re-authentication-authorization request sent by an AAA-S network element is received.

Here, in some examples of this disclosure, the re-authentication-authorization method in this disclosure can be performed by the above-mentioned NSSAAF network element. For example, the NSSAAF network element may be an AIAAF (Artificial Intelligence Authentication and Authorization Function) network element.

In some examples of this disclosure, after initial registration of an AI network function is completed, the AI network function is usually to be authenticated and authorized again (for example, when the AI network function needs to be regularly updated, parameters thereof need to be changed, and the like, the AI network function needs to be authenticated and authorized again). Accordingly, the AAA-S network element may send a re-authentication-authorization request to the AIAAF network element.

Here, in some examples of this disclosure, the above-mentioned re-authentication-authorization request may include AIFSAI (AI Function Selection Assistance Information) and a first identifier used to identify a UE (User Equipment) served by the AI network function. Here, in some examples of this disclosure, the above-mentioned first identifier may be a GPSI (Generic Public Subscription Identifier). Moreover, in some examples of this disclosure, the above-mentioned AIFSAI may include a second identifier used to identify the AI network function, where the second identifier may be, for example, at least one of an AI service ID (Identifier) corresponding to the AI network function and an AI service type.

Further, in some examples of this disclosure, a manner for receiving the above-mentioned re-authentication-authorization request sent by the AAA-S network element may include: receiving an AAA (authentication and authorization) re-authentication-authorization request (e.g., AAA Protocol Re-Auth Request) sent directly by the AAA-S network element. In some examples of this disclosure, the AAA re-authentication-authorization request includes the AIFSAI and the first identifier.

Moreover, in some examples of this disclosure, if the AI service function needs communication with other network elements through an AAA-P (Authentication, Authorization, Accounting-Proxy) network element, then the manner for receiving the above-mentioned re-authentication-authorization request sent by the AAA-S network element may include: receiving an AAA re-authentication-authorization request transparently transmitted by the AAA-S network element through the AAA-P. In some examples of this disclosure, the AAA re-authentication-authorization request may include the AIFSAI and the first identifier.

In addition, it should be noted that in some examples of this disclosure, when the re-authentication-authorization request is sent by the AAA-S network element to the AIAAF network element under the premise that "parameter changes need to be made to the AI network function", the re-authentication-authorization request may further include a re-authentication parameter(s) corresponding to the re-authentication-authorization. Specifically, the re-authentication parameter(s) may include: a parameter(s) that needs to be changed in the AI network function, and a changed result(s) corresponding to the parameter(s) that needs to be changed, so that subsequently the AIAAF network elements can re-authenticate the AI network function based on the re-authentication parameter(s). Moreover, when the re-authentication-authorization request is sent from the AAA-S network element to the AIAAF network element under the premise that "the AI network function needs to be regularly updated", the re-authentication-authorization request may only include the AIFSAI and the first identifier.

In step 202, re-authentication-authorization is performed on the AI network function based on the AIFSAI and the first identifier.

Here, in some examples of this disclosure, the content of the AIAAF network element performing re-authentication-authorization on the AI network function based on the AIFSAI and the first identifier will be introduced in detail in subsequent examples.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 3:
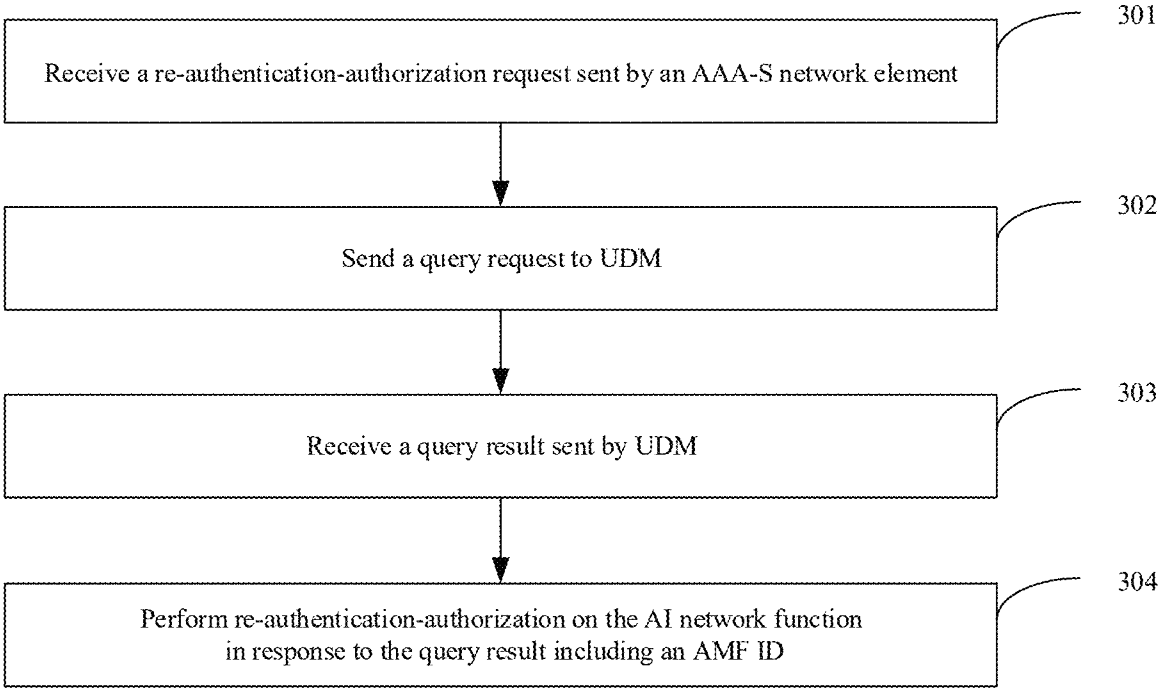
FIG. 3 is a schematic flowchart of a re-authentication-authorization method for AI network function(s) according to one or more examples of this disclosure.

FIG. 3 is a schematic flowchart of a re-authentication-authorization method for AI network function(s) according to some examples of this disclosure. The method is performed by the NSSAAF network element. As shown in FIG. 3, the re-authentication-authorization method for AI network function(s) may include the following steps.

In step 301, a re-authentication-authorization request sent by an AAA-S network element is received.

For detailed introduction to the above step 301, the description of the above examples can be referred to and will not be repeated here in the examples of this disclosure.

In step 302, a query request is sent to a UDM function.

Here, in some examples of this disclosure, the query request may include the AIFSAI and the first identifier.

Moreover, in some examples of this disclosure, the AIAAF network element may specifically send the query request to the UDM through "Nudm_UECM_Get".

Further, in some examples of this disclosure, after the AIAAF network element sends the query request to the UDM, the UDM can perform query based on the AIFSAI and the first identifier, and send a query result to the AIAAF network element. Specifically, in some examples of this disclosure, the UDM can first query whether a second identifier exists in the UDM. If the second identifier exists in the UDM, it means that the AI network function corresponding to the second identifier has been successfully registered and, accordingly, can be authorized and authenticated again. Then, the UDM can further query, based on the first identifier, an AMF ID of a currently serving AMF of the UE corresponding to the first identifier, and send the AMF ID to the AIAAF network element. If the second identifier does not exist in the UDM, it means that the AI network function corresponding to the second identifier has not been registered successfully and, thus, cannot be authorized and authenticated again. Then, the UDM will send a query failure indication to the AIAAF network element.

In step 303, a query result sent by the UDM is received.

Here, in some examples of this disclosure, the query result may include an AMF ID or a query failure indication.

In step 304, in response to the query result including the AMF ID, re-authentication-authorization is performed on the AI network function.

Here, in some examples of this disclosure, if the query result includes the AMF ID, it means that the AI network function can be re-authenticated. Accordingly, the AIAAF can directly perform re-authentication-authorization on the AI network function.

Moreover, in an example of this disclosure, when the AIAAF performs the re-authentication-authorization on the AI network function, if the re-authentication-authorization request received in step 201 above includes a re-authentication parameter(s), the AIAAF can perform re-authentication-authorization on the AI network function based on the re-authentication parameter(s). For example, based on the re-authentication parameter(s), a parameter(s) that needs to be changed in the AI network function and a changed result(s) corresponding to the parameter(s) that needs to be changed can be determined; and then the parameter(s) that needs to be changed can be directly changed. Moreover, if the re-authentication-authorization request received in step 201 above does not include any re-authentication parameter, the AIAAF network element is to perform only regular update checks on the AI network function, so as to update the service log corresponding to the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 4:
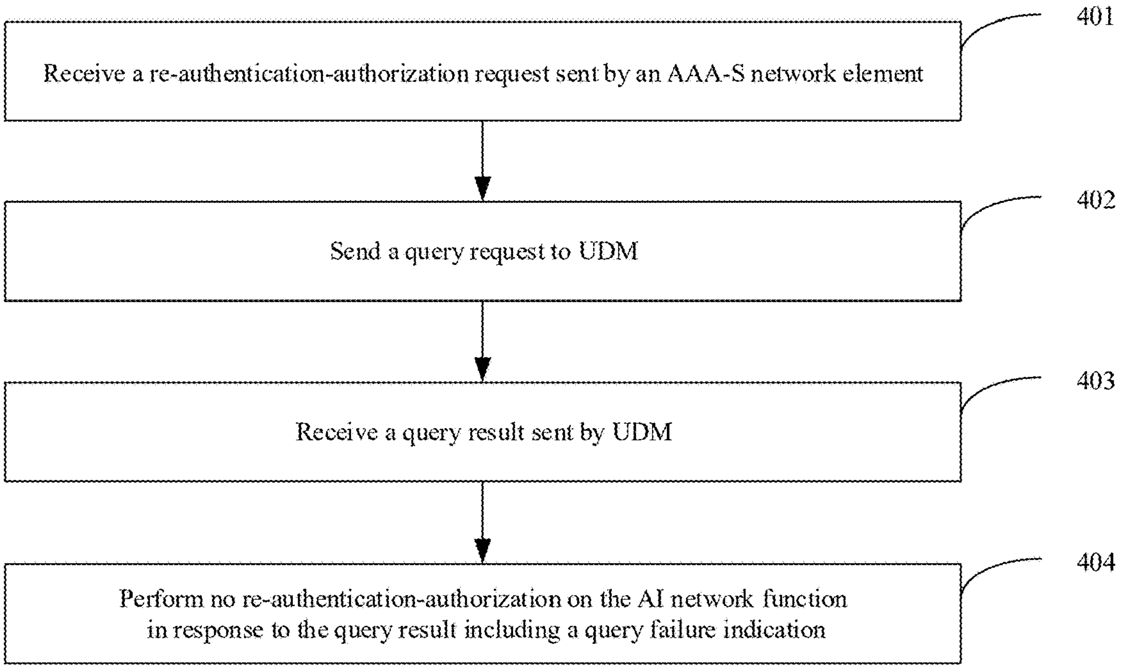
FIG. 4 is a schematic flowchart of a re-authentication-authorization method for AI network function(s) according to one or more examples of this disclosure.

FIG. 4 is a schematic flow chart of a re-authentication-authorization method for AI network function(s) according to some examples of this disclosure. The method is performed by an NSSAAF network element. As shown in FIG. 4, the re-authentication-authorization method for AI network function(s) may include the following steps.

In step 401, a re-authentication-authorization request sent by an AAA-S network element is received.

In step 402, a query request is sent to UDM.

In step 403, a query result sent by the UDM is received.

For detailed introduction to the steps 401-403, the description of the above examples can be referred to and will not be repeated here in the examples of this disclosure.

In step 404, in response to the query result including a query failure indication, re-authentication-authorization is not performed on the AI network function.

Here, in some examples of this disclosure, when the query result includes the query failure indication, it means that the AI network function has not been successfully registered, and the AIAAF network element cannot perform re-authentication-authorization on the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 5:
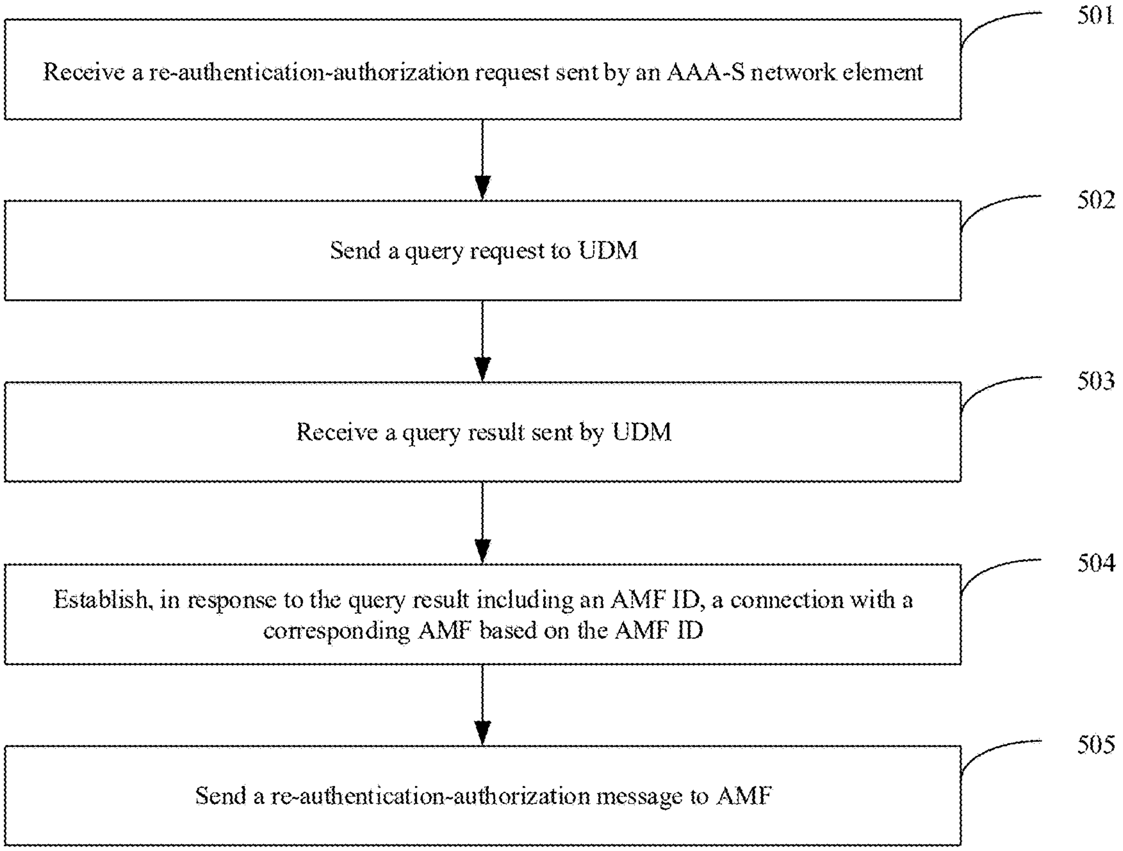
FIG. 5 is a schematic flowchart of a re-authentication-authorization method for AI network function(s) according to one or more examples of this disclosure.

FIG. 5 is a schematic flowchart of a re-authentication-authorization method for AI network function(s) according to some examples of this disclosure. The method is performed by the NSSAAF network element. As shown in FIG. 5, the re-authentication-authorization method for AI network function(s) may include the following steps.

In step 501, a re-authentication-authorization request sent by an AAA-S network element is received.

In step 502, a query request is sent to UDM.

In step 503, a query result sent by the UDM is received.

For detailed introduction to the steps 501-503, the description of the above examples can be referred to and will not be repeated here in the examples of this disclosure.

In step 504, in response to the query result including an AMF ID, a connection is established with the corresponding AMF based on the AMF ID.

Here, in some examples of this disclosure, when the query result includes the AMF ID, it means that the AIAAF network element can subsequently perform re-authentication-authorization on the AI network function. Accordingly, the AIAAF is to first establish a connection with the corresponding AMF based on the AMF ID, so that it can subsequently notify the AMF that the AIAAF will perform re-authentication-authorization on the AI network function (s).

In addition, the AIAAF network element can establish the connection with the AMF corresponding to the AMF ID based on an existing connection manner, which is not elaborated here in the examples.

In step 505, a re-authentication-authorization message is sent to the AMF.

Here, in some examples of this disclosure, the re-authentication-authorization message is used to indicate that the AIAAF network element performs re-authentication-authorization on the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 6:
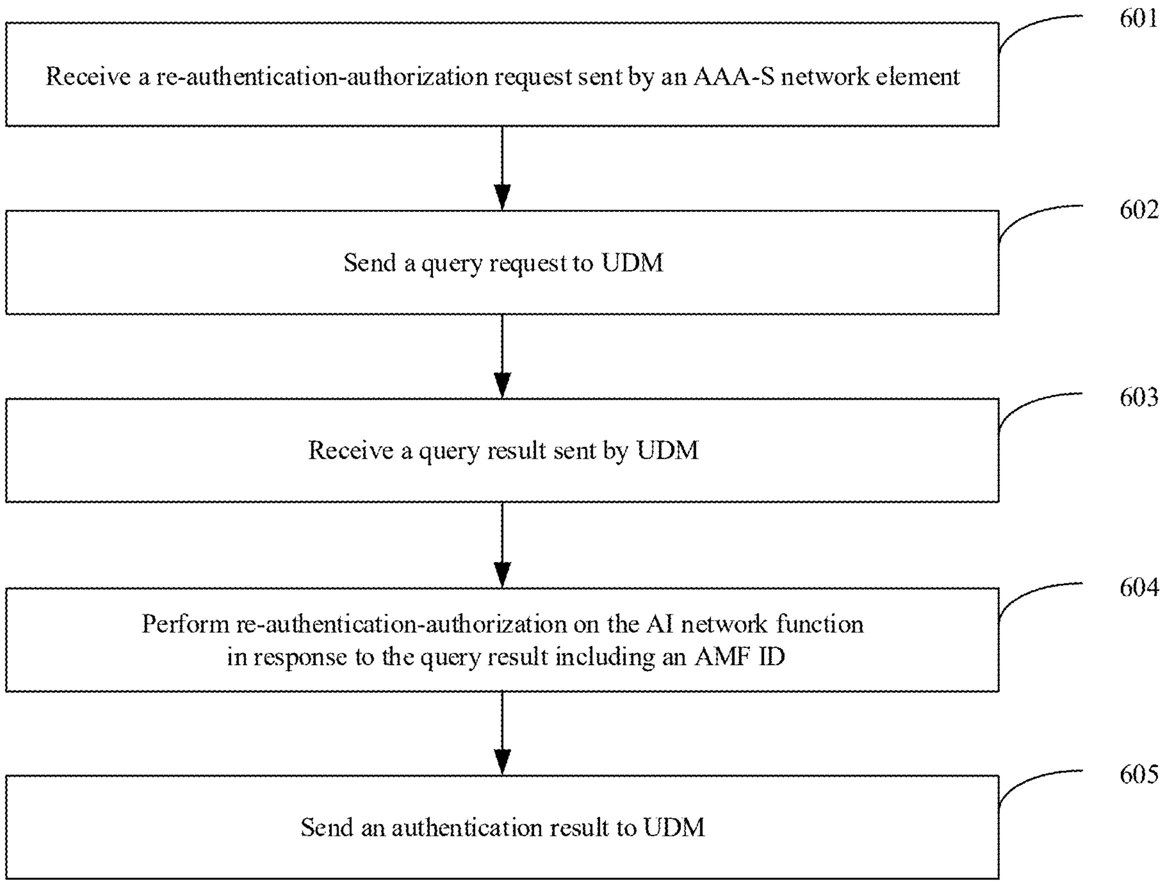
FIG. 6 is a schematic flowchart of a re-authentication-authorization method for AI network function(s) according to one or more examples of this disclosure.

FIG. 6 is a schematic flowchart of a re-authentication-authorization method for AI network function(s) according to some examples of this disclosure. The method is performed by an NSSAAF network element. As shown in FIG. 6, the re-authentication-authorization method for AI network function(s) may include the following steps.

In step 601, a re-authentication-authorization request sent by an AAA-S network element is received.

In step 602, a query request is sent to UDM.

In step 603, a query result sent by the UDM is received.

In step 604, in response to the query result including an AMF ID, re-authentication-authorization is performed on the AI network function.

For detailed introduction to the steps 601-604, the description of the above examples can be referred to and will not be repeated here in the examples of this disclosure.

In step 605, an authentication result is sent to the UDM.

In some examples of this disclosure, the authentication result may include parameter information after re-authentication-authorization of the AI network function.

Moreover, in some examples of this disclosure, the AIAAF network element sends the authentication result to the UDM, so that the UDM can update the parameter(s) of the AI network function based on the authentication result. Specifically, based on the parameter information in the authentication result, the UDM can replace the original parameter(s) in the AI network function with the corresponding parameter information in the authentication result, so as to update the parameter(s) of the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 7:
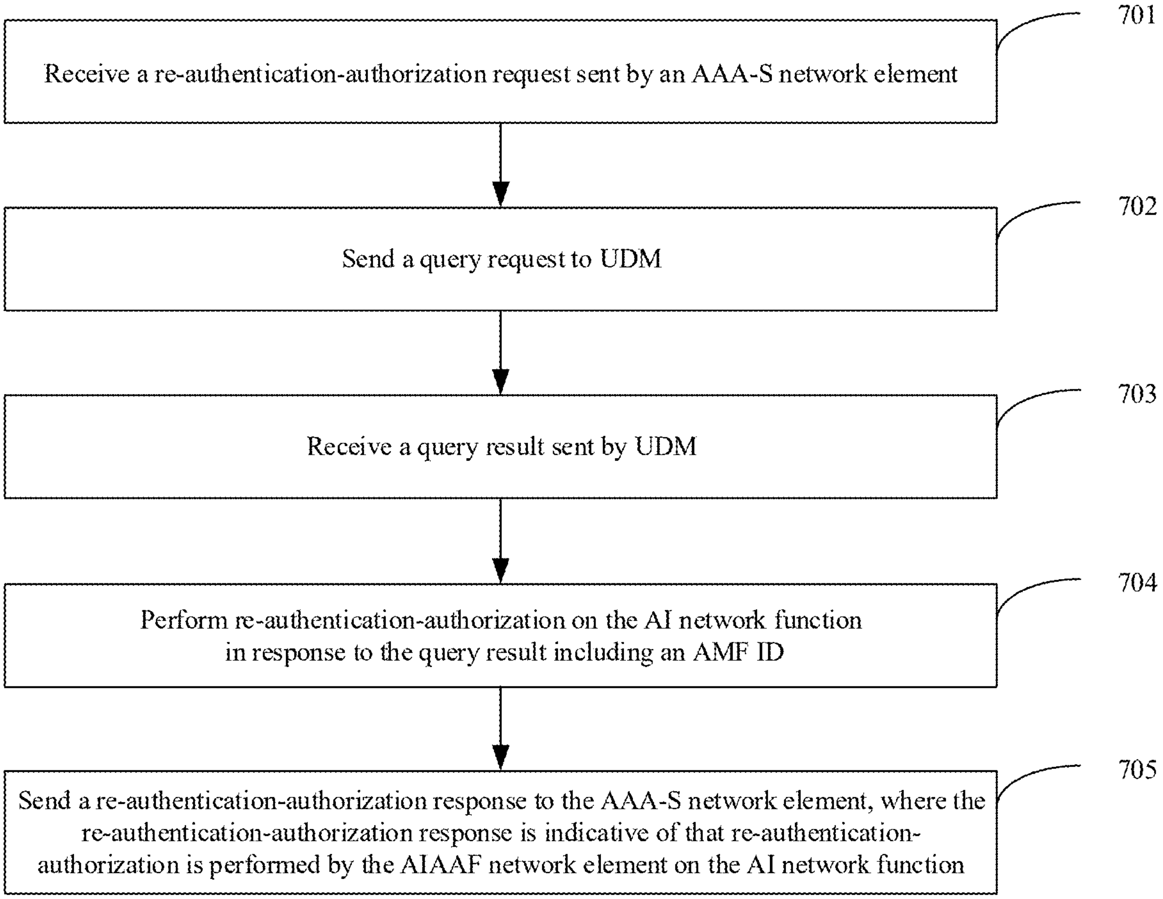
FIG. 7 is a schematic flowchart of a re-authentication-authorization method for AI network function(s) according to one or more examples of this disclosure.

FIG. 7 is a schematic flow chart of a re-authentication-authorization method for AI network function(s) according to some examples of this disclosure. The method is performed by an NSSAAF network element. As shown in FIG. 7, the re-authentication-authorization method for AI network function(s) may include the following steps.

In step 701, a re-authentication-authorization request sent by an AAA-S network element is received.

In step 702, a query request is sent to UDM.

In step 703, a query result sent by the UDM is received.

In step 704, in response to the query result including an AMF ID, re-authentication-authorization is performed on the AI network function.

For detailed introduction to the steps 701-704, the description of the above examples can be referred to and will not be repeated here in the examples of this disclosure.

In step 705, a re-authentication-authorization response is sent to the AAA-S network element, where the re-authentication-authorization response is used to indicate that the AIAAF network element has performed re-authentication-authorization on the AI network function.

Here, in some examples of this disclosure, a manner for sending the above-mentioned re-authentication-authorization response to the AAA-S network element may include: directly sending an AAA re-authentication-authorization response (e.g., AAA Protocol Re-Auth Response) to the AAA-S network element, where the AAA re-authentication-authorization response is used to indicate that the AIAAF network element has performed re-authentication-authorization on the AI network function.

Moreover, in some other examples of this disclosure, if the AI service function needs communication with other network elements through an AAA-P network element, a manner for sending the above-mentioned re-authentication-authorization response to the AAA-S network element may include: transparently transmitting the AAA re-authentication-authorization response to the AAA-S network element through the AAA-P network element, where the AAA re-authentication-authorization response is used to indicate that the AIAAF network element has performed re-authentication-authorization on the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 8:
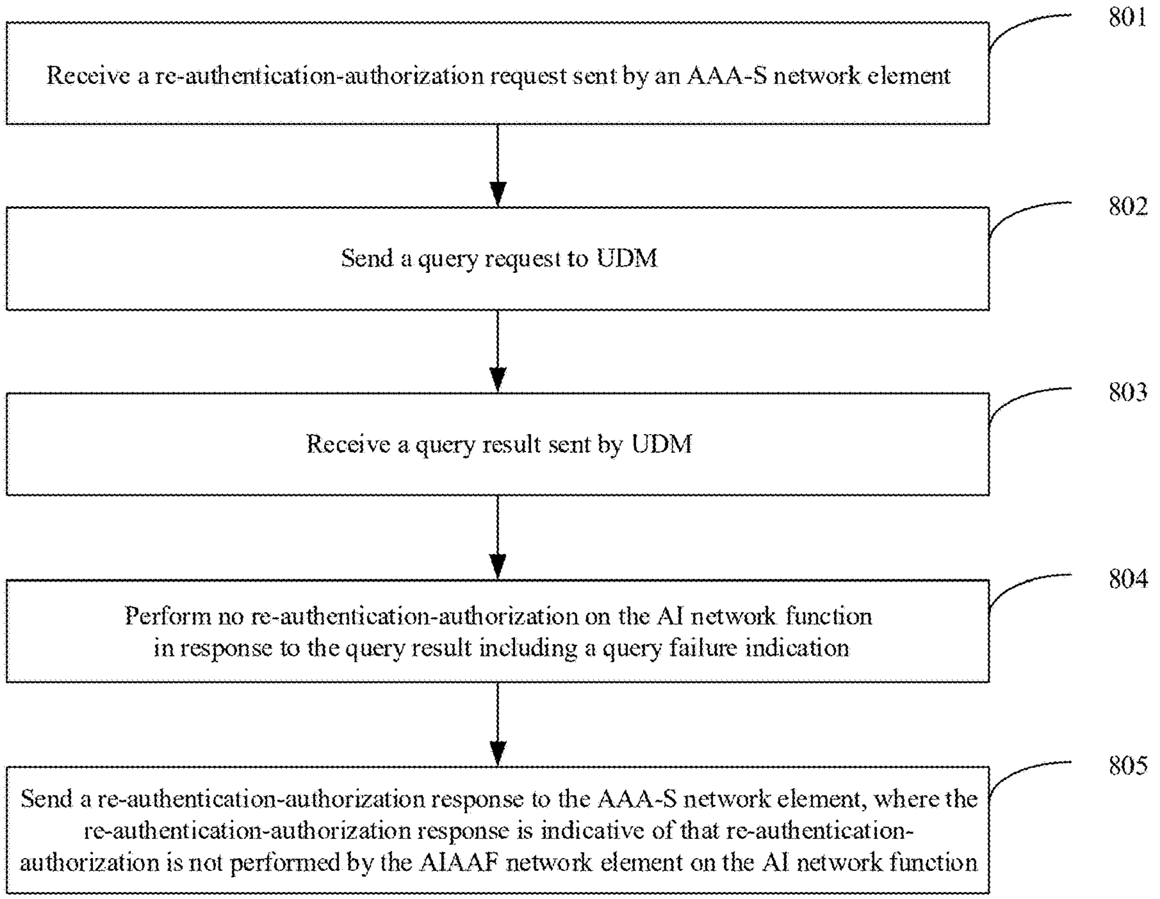
FIG. 8 is a schematic flowchart of a re-authentication-authorization method for AI network function(s) according to one or more examples of this disclosure.

FIG. 8 is a schematic flowchart of a re-authentication-authorization method for AI network function(s) according to some examples of this disclosure. The method is performed by an NSSAAF network element. As shown in FIG. 8, the re-authentication-authorization method for AI network function(s) may include the following steps.

In step 801, a re-authentication-authorization request sent by an AAA-S network element is received.

In step 802, a query request is sent to UDM.

In step 803, a query result sent by the UDM is received.

In step 804, in response to the query result including a query failure indication, re-authentication-authorization is not performed on the AI network function.

For detailed introduction to the steps 801-804, the description of the above examples can be referred to and will not be repeated here in the examples of this disclosure.

In step 805, a re-authentication-authorization response is sent to the AAA-S network element, where the re-authentication-authorization response is used to indicate that the AIAAF network element does not perform re-authentication-authorization on the AI network function.

Here, in some examples of this disclosure, a manner for sending the above-mentioned re-authentication-authorization response to the AAA-S network element may include: directly sending an AAA re-authentication-authorization response to the AAA-S network element, where the AAA re-authentication-authorization response is used to indicate that the AIAAF network element does not perform re-authentication-authorization on the AI network function.

Moreover, in some examples of this disclosure, if the AI service function needs communication with other network elements through an AAA-P network element, a manner for sending the above-mentioned re-authentication-authorization response to the AAA-S network element may include: transparently transmitting the AAA re-authentication-authorization response to the AAA-S network element through the AAA-P network element, where the AAA re-authentication-authorization response is used to indicate that the AIAAF network element does not perform re-authentication-authorization on the AI network function.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 9:
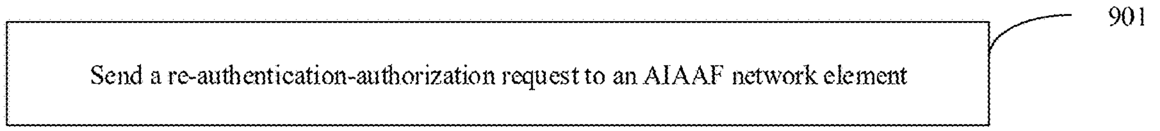
FIG. 9 is a schematic flowchart of a re-authentication-authorization method for AI network function(s) according to one or more examples of this disclosure.

FIG. 9 is a schematic flow chart of a re-authentication-authorization method for AI network function(s) according to some examples of this disclosure. The method is performed by an AAA-S network element. As shown in FIG. 9, the re-authentication-authorization method for AI network function(s) may include the following steps.

In step 901, a re-authentication-authorization request is sent to an AIAAF network element.

In some examples of this disclosure, the re-authentication-authorization request may include AIFSAI and a first identifier used to identify UE served by the AI network function.

Moreover, in some examples of this disclosure, a manner for sending the above-mentioned re-authentication-authorization request to the AIAAF network element may include: directly sending an AAA re-authentication-authorization request to the AIAAF network element. In some examples of this disclosure, the AAA re-authentication-authorization request includes the AIFSAI and the first identifier.

In some examples of this disclosure, if the AI service function needs communication with other network elements through an AAA-P network element, then the manner for sending the above-mentioned re-authentication-authorization request to the AIAAF network element may include: transparently transmitting an AAA re-authentication-authorization request to the AIAAF network element through the AAA-P network element. In some examples of this disclosure, the AAA re-authentication-authorization request may include the AIFSAI and the first identifier.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 10:
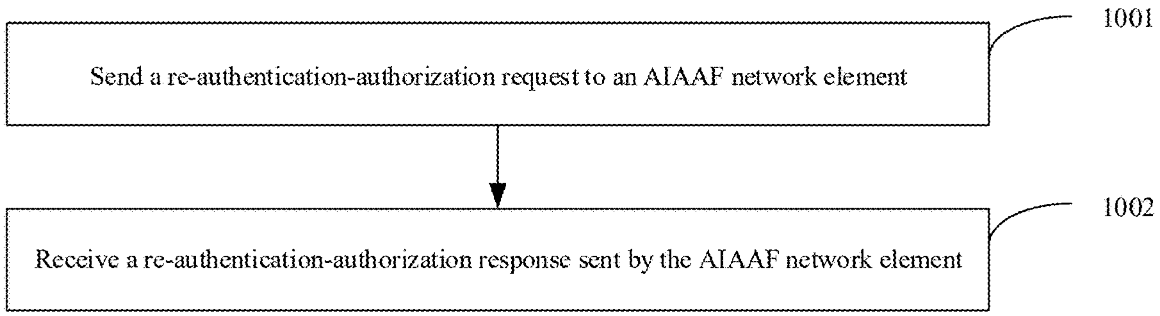
FIG. 10 is a schematic flowchart of a re-authentication-authorization method for AI network function(s) according to one or more examples of this disclosure.

FIG. 10 is a schematic flow chart of a re-authentication-authorization method for AI network function(s) according to some examples of this disclosure. The method is performed by an AAA-S network element. As shown in FIG. 10, the re-authentication-authorization method for AI network function(s) may include the following steps.

In step 1001, a re-authentication-authorization request is sent to an AIAAF network element.

In step 1002, a re-authentication-authorization response sent by the AIAAF network element is received.

Here, in some examples of this disclosure, the above-mentioned re-authentication-authorization response may be used to indicate whether the AIAAF network element performs the re-authentication-authorization on the AI network function.

Specifically, in some examples of this disclosure, if the AIAAF network element has performed the re-authentication-authorization on the AI network function, the re-authentication-authorization response is used to indicate that the AIAAF network element has performed the re-authentication-authorization on the AI network function.

In some examples of this disclosure, if the AIAAF network element does not perform re-authentication-authorization on the AI network function, the re-authentication-authorization response is used to indicate that the AIAAF network element does not perform re-authentication-authorization on the AI network function.

Moreover, in some examples of this disclosure, a manner for receiving the above-mentioned re-authentication-authorization response sent by the AIAAF network element may include: receiving an AAA re-authentication-authorization response sent by the AIAAF network element. In some examples of this disclosure, the AAA re-authentication-authorization response may be used to indicate whether the AIAAF network element performs the re-authentication-authorization on the AI network function.

In some examples of this disclosure, if the AI service function needs communication with other network elements through an AAA-P network element, the manner for receiving the above-mentioned re-authentication-authorization response sent by the AIAAF network element may include: receiving an AAA re-authentication-authorization response transparently transmitted by the AIAAF network element through the AAA-P network element. In some examples of this disclosure, the AAA re-authentication-authorization request may include the AIFSAI and the first identifier.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 11:
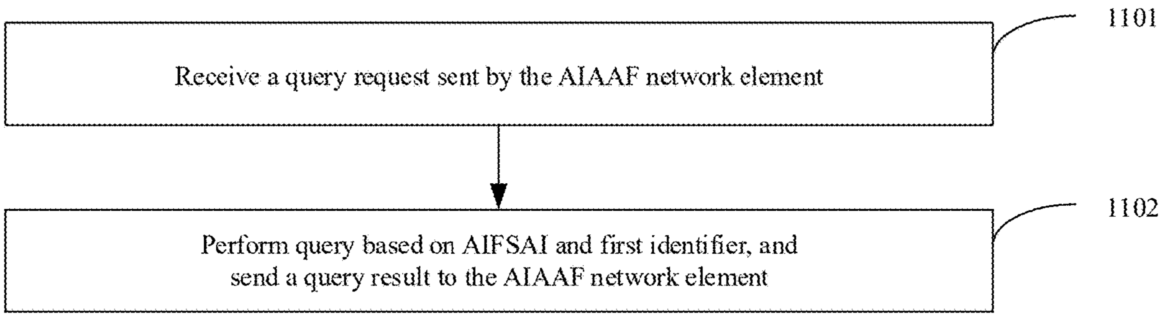
FIG. 11 is a schematic flowchart of a re-authentication-authorization method for AI network function(s) according to one or more examples of this disclosure.

FIG. 11 is a schematic flowchart of a re-authentication-authorization method for AI network function(s) according to some examples of this disclosure. The method is performed by UDM. As shown in FIG. 11, the re-authentication-authorization method for AI network function(s) may include the following steps.

In step 1101, a query request sent by an AIAAF network element is received.

In some examples of this disclosure, the query request may include the AIFSAI and a first identifier used to identify the UE served by the AI network function.

Moreover, in some examples of this disclosure, the above-mentioned first identifier may be a GPSI identifier. Furthermore, in some examples of this disclosure, the AIFSAI may include a second identifier used to identify the AI network function, where the second identifier may be, for example, at least one of an AI service ID and an AI service type.

In step 1102, a query is performed based on the AIFSAI and the first identifier, and a query result is sent to the AIAAF network element.

Here, in some examples of this disclosure, the query result may include an AMF ID or a query failure indication.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 12:
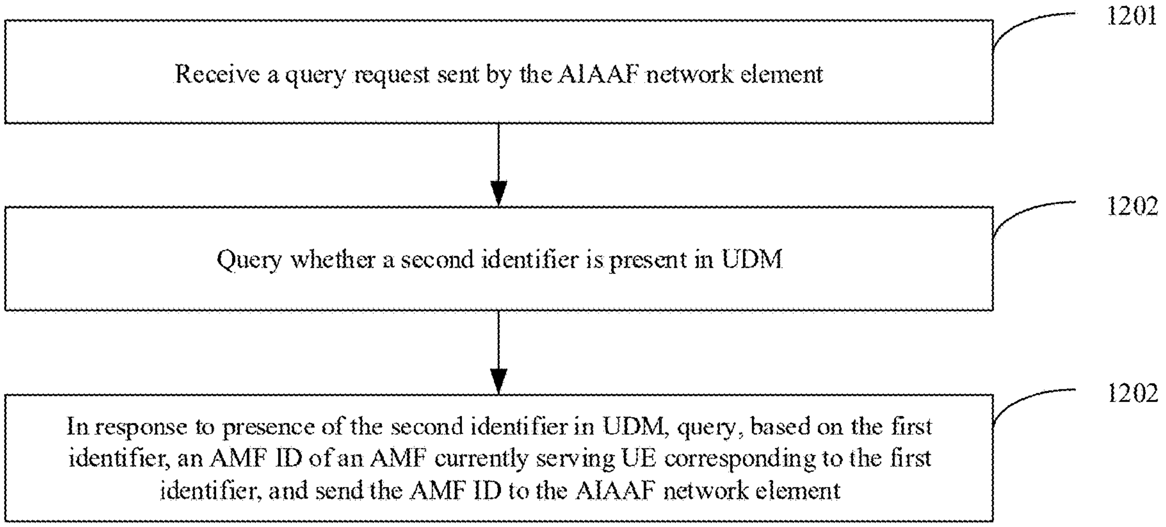
FIG. 12 is a schematic flowchart of a re-authentication-authorization method for AI network function(s) according to one or more examples of this disclosure.

FIG. 12 is a schematic flowchart of a re-authentication-authorization method for AI network function(s) according to some examples of this disclosure. The method is performed by UDM. As shown in FIG. 12, the re-authentication-authorization method for AI network function(s) may include the following steps.

In step 1201, a query request sent by an AIAAF network element is received.

In step 1202, it is queried whether a second identifier exists in the UDM.

In some examples of the present application, the UDM can determine whether an AI network function corresponding to the second identifier is successfully registered based on querying of whether the second identifier exists in the UDM. Specifically, if the second identifier exists in the UDM, it means that the AI network function corresponding to the second identifier has been successfully registered; otherwise, the AI network function corresponding to the second identifier has not been successfully registered, and there is no information corresponding to the AI network function in the UDM.

In step 1203, in response to existence of the second identifier in the UDM, an AMF ID of a currently serving AMF of the UE corresponding to the first identifier is queried based on the first identifier, and the AMF ID is sent to the AIAAF network element.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 13:
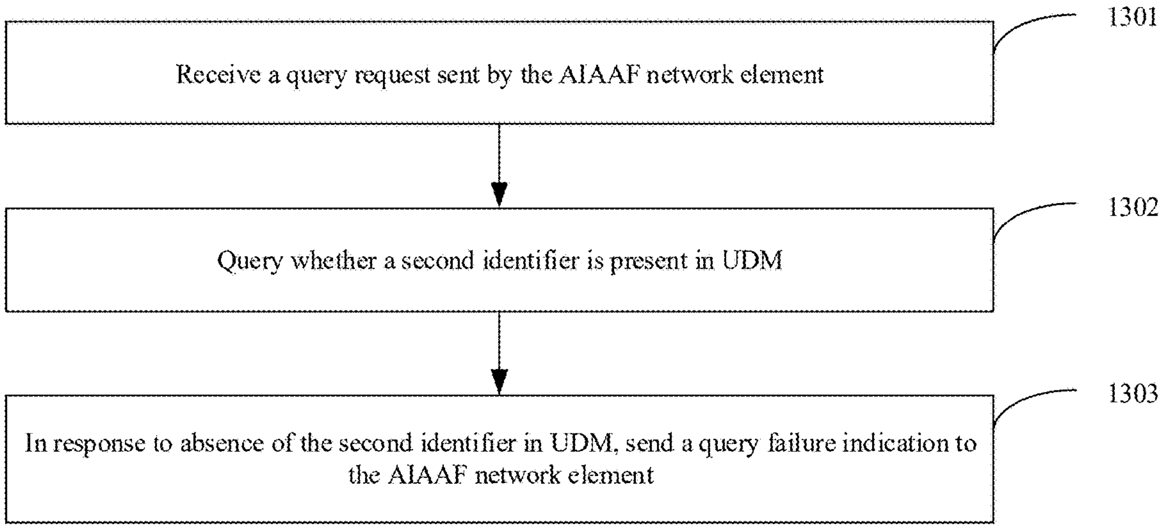
FIG. 13 is a schematic flowchart of a re-authentication-authorization method for AI network function(s) according to one or more examples of this disclosure.

FIG. 13 is a schematic flowchart of a re-authentication-authorization method for AI network function(s) according to some examples of this disclosure. The method is performed by UDM. As shown in FIG. 13, the re-authentication-authorization method for AI network function(s) may include the following steps.

In step 1301, a query request sent by an AIAAF network element is received.

In step 1302, it is queried whether a second identifier exists in the UDM.

In some examples of the present application, the UDM can determine whether an AI network function corresponding to the second identifier is successfully registered based on querying of whether the second identifier exists in the UDM. Specifically, if the second identifier exists in the UDM, it means that the AI network function corresponding to the second identifier has been successfully registered; otherwise, the AI network function corresponding to the second identifier has not been successfully registered, and there is no information corresponding to the AI network function in the UDM.

In step 1303, in response to that the second identifier does not exist in the UDM, a query failure indication is sent to the AIAAF network element.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 14:
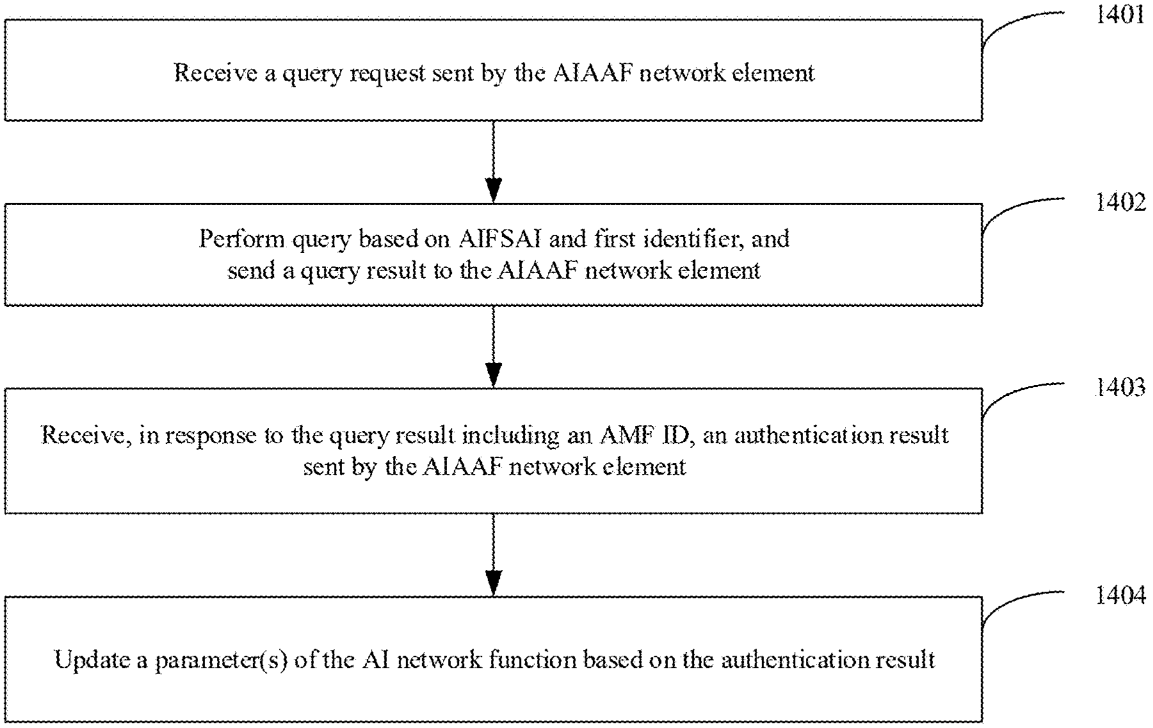
FIG. 14 is a schematic flowchart of a re-authentication-authorization method for AI network function(s) according to one or more examples of this disclosure.

FIG. 14 is a schematic flowchart of a re-authentication-authorization method for AI network function(s) according to some examples of this disclosure. The method is performed by UDM. As shown in FIG. 14, the re-authentication-authorization method for AI network function(s) may include the following steps.

In step 1401, a query request sent by an AIAAF network element is received.

In step 1402, a query is performed based on the AIFSAI and the first identifier, and a query result is sent to the AIAAF network element.

In step 1403, in response to the query result including an AMF ID, an authentication result sent by the AIAAF network element is received.

In some examples of this disclosure, the authentication result may include parameter information after re-authentication-authorization of the AI network function.

In step 1404, a parameter(s) of the AI network function is updated based on the authentication result.

Here, in some examples of this disclosure, the UDM can determine, based on the parameter information after re-authentication-authorization of the AI network function in the authentication result, a parameter(s) that needs to be updated for the AI network function and an updated result(s) corresponding to the parameter(s). Subsequently, the parameter(s) that needs to be updated can be directly updated, so as update the parameter(s) of the AI network function.

For detailed introduction to other contents in these examples, the relevant introduction in the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 15:
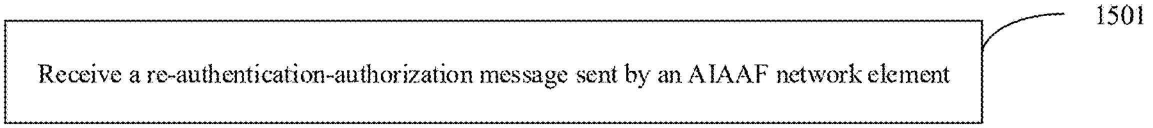
FIG. 15 is a schematic flowchart of a re-authentication-authorization method for AI network function(s) according to one or more examples of this disclosure.

FIG. 15 is a schematic flowchart of a re-authentication-authorization method for AI network function(s) according to some examples of this disclosure. The method is performed by AMF. As shown in FIG. 15, the re-authentication-authorization method for AI network function(s) may include the following steps.

In step 1501, a re-authentication-authorization message sent by an AIAAF network element is received.

In some examples of this disclosure, the above-mentioned re-authentication-authorization message may be used to indicate that the AIAAF performs re-authentication-authorization on the AI network function.

For detailed introduction to the step 1501, the description of the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 16:
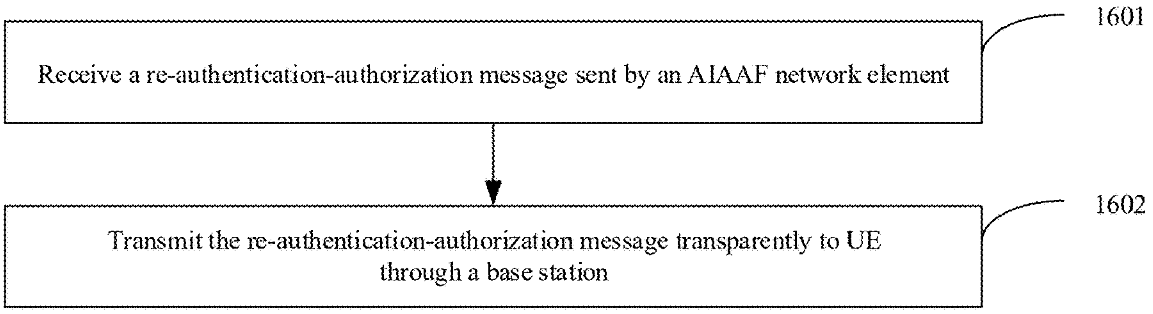
FIG. 16 is a schematic flowchart of a re-authentication-authorization method for AI network function(s) according to one or more examples of this disclosure.

FIG. 16 is a schematic flowchart of a re-authentication-authorization method for AI network function(s) according to some examples of this disclosure. The method is performed by AMF. As shown in FIG. 16, the re-authentication-authorization method for AI network function(s) may include the following steps.

In step 1601, a re-authentication-authorization message sent by an AIAAF network element is received.

In step 1602, the re-authentication-authorization message is transmitted transparently to UE through a base station.

For detailed introduction to the steps 1601-1602, the description of the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 17:
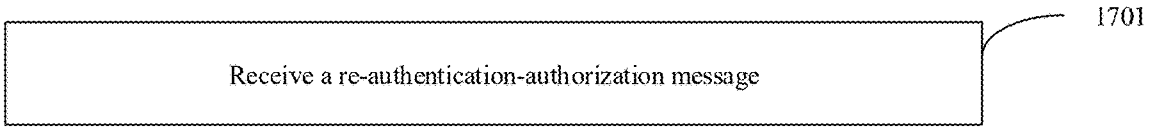
FIG. 17 is a schematic flowchart of a re-authentication-authorization method for AI network function(s) according to one or more examples of this disclosure.

FIG. 17 is a schematic flowchart of a re-authentication-authorization method for AI network function(s) according to some examples of this disclosure. The method is performed by UE. As shown in FIG. 17, the re-authentication-authorization method for AI network function(s) may include the following steps.

In step 1701, a re-authentication-authorization message is received.

In some examples of this disclosure, the above-mentioned re-authentication-authorization message may be used to indicate that an AIAAF performs re-authentication-authorization on the AI network function.

Furthermore, the re-authentication-authorization message may be transparently transmitted by an AMF to the UE through a base station.

For detailed introduction to the step 1701, the description of the above examples can be referred to and will not be repeated here in the examples of this disclosure.

To sum up, in the re-authentication-authorization method for AI network function(s) according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 18:
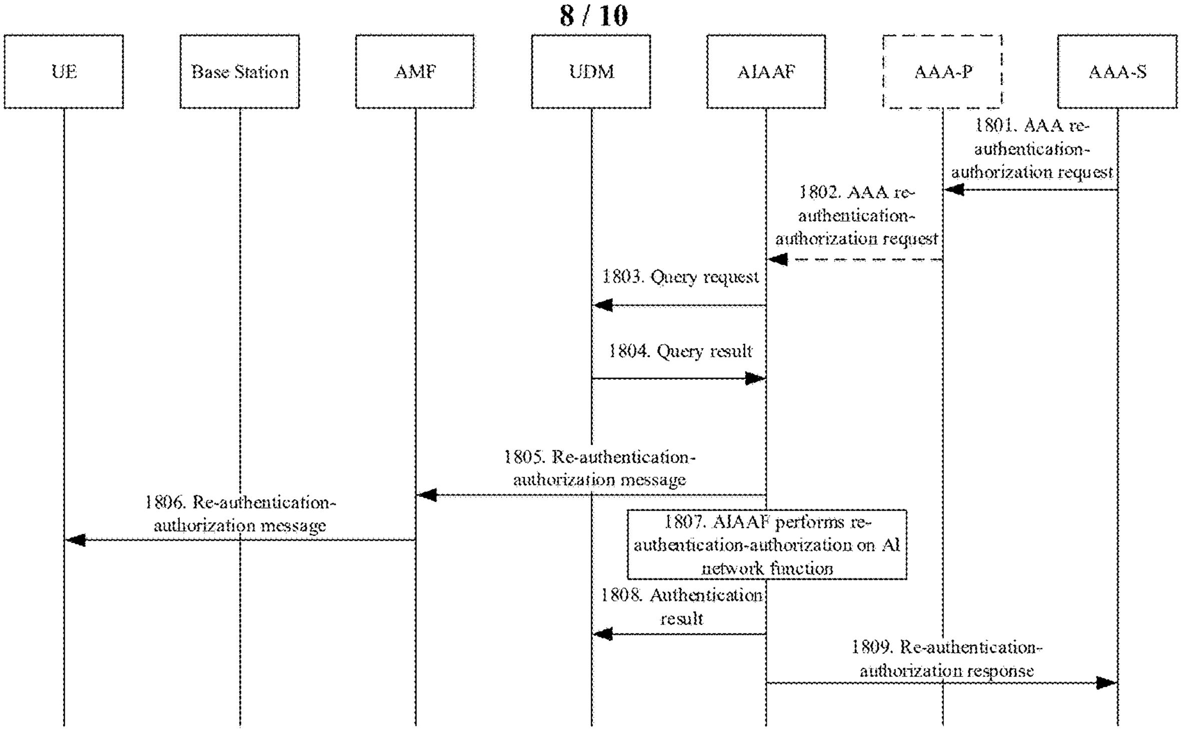
FIG. 18 is a schematic flowchart illustrating interactions of re-authentication-authorization for AI network function (s) according to one or more examples of this disclosure.

Based on the above description, FIG. 18 is a schematic flowchart illustrating interactions of re-authentication-authorization for AI network function(s) according to some examples of this disclosure. As shown in FIG. 18, the interactions process may include the following steps.

In step 1801, the AAA-S network element sends an AAA re-authentication-authorization request (AAA Protocol Re-Auth Request) to the AIAAF network element.

In some examples of this disclosure, the AAA re-authentication-authorization request includes AIFSAI and a first identifier used to identify the UE served by the AI network function.

In step 1802, if the AI service function needs communication with other network elements through an AAA-P network element, the AAA-S network element transparently transmits the AAA re-authentication-authorization request to the AIAAF network element through the AAA-P network element.

In step 1803, after receiving the AAA re-authentication-authorization request, the AIAAF network element sends a query request to the UDM.

In step 1804, the UDM sends a query result to the AIAAF network element.

Here, in some examples of this disclosure, if the UDM finds the AMF ID of the currently serving AMF of the UE corresponding to the first identifier, the AMF ID is returned; otherwise, FALSE (query failure indication) is returned, and the process ends.

In step 1805, in response to the query result including the AMF ID, the AIAAF network element sends a re-authentication-authorization message (AAA Protocol Re-Auth) to the AMF.

In step 1806, the AMF receives the re-authentication-authorization message sent by the AIAAF network element, and transparently transmits the re-authentication-authorization message to the UE through the base station.

In step 1807, in response to the query result including the AMF ID, the AIAAF network element performs re-authentication-authorization on the AI network function.

In step 1808, the AIAAF network element sends an authentication result to the UDM, where the authentication result includes parameter information after re-authentication-authorization of the AI network function.

In some examples of this disclosure, after receiving the authentication result sent by the AIAAF network element, the UDM updates the parameter(s) of the AI network function based on the authentication result.

In step 1809, the AIAAF network element sends a re-authentication-authorization response (AAA Protocol Re-Auth Response) to the AAA-S network element, where the re-authentication-authorization response is used to indicate that the AIAAF network element successfully performs re-authentication-authorization of the AI network function.

Here, in some examples of this disclosure, if the AI service function needs communication with other network elements through the AAA-P network element, the AIAAF network element transparently transmits the re-authentication-authorization response to the AAA-S network element through the AAA-P network element.

Moreover, in some examples of this disclosure, in response to the query result including FALSE, the AIAAF network element sends a re-authentication-authorization response to the AAA-S network element, where the re-authentication-authorization response is used to indicate that the AIAAF network element does not perform re-authentication-authorization on the AI network function.

In the above examples provided by the present application, the methods according to some examples of the present application are described from the perspectives of network devices and UE respectively. In order to implement each function in the method according to the above examples of the present application, the network devices and the UE may include a hardware structure(s) and/or a software module(s) to implement the above functions in the form of a hardware structure, a software module, or a hardware structure plus a software module. A certain function among the above functions may be performed by a hardware structure, a software module, or a hardware structure plus a software module.

Figure 19:
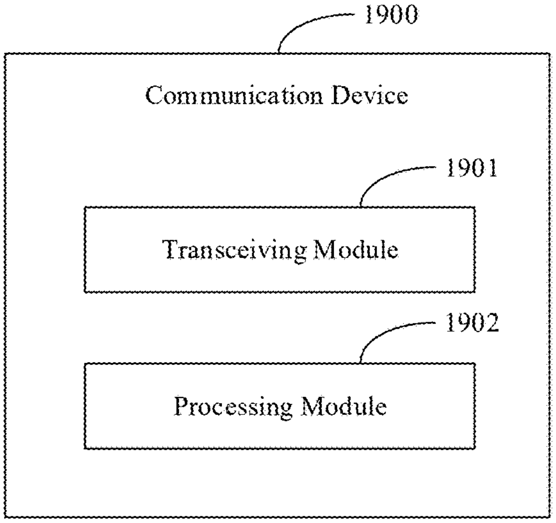
FIG. 19 is a schematic structural diagram of a communication device according to one or more examples of this disclosure.

FIG. 19 is a schematic structural diagram of a communication device according to some examples of this disclosure. As shown in FIG. 19, the device may include:

a transceiving module 1901, configured to receive a re-authentication-authorization request sent by an AAA-S network element, where the re-authentication-authorization request includes AIFSAI and a first identifier used for identifying UE served by the AI network function; and a processing module 1902, configured to perform re-authentication-authorization on the AI network function based on the AIFSAI and the first identifier.

To sum up, in the communication device according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Optionally, in some examples of this disclosure, the above-mentioned transceiver module 1901 is further configured to:

receive an AAA re-authentication-authorization request sent by the AAA-S network element, where the AAA re-authentication-authorization request includes the AIFSAI and the first identifier.

Optionally, in some examples of this disclosure, the above-mentioned transceiver module 1901 is further configured to:

receive an AAA re-authentication-authorization request transparently transmitted by the AAA-S network element through an AAA-P network element, where the AAA re-authentication-authorization request includes the AIFSAI and the first identifier.

Optionally, in some examples of this disclosure, the AIFSAI includes a second identifier used to identify the AI network function.

Optionally, in some examples of this disclosure, the above process 1902 is further configured to:

send a query request to UDM, where the query request includes the AIFSAI and the first identifier;

receive a query result sent by the UDM;

determine whether to perform re-authentication-authorization on the AI network function based on the query result; and perform, in response to the query result including an AMF ID, the re-authentication-authorization on the AI network function; and perform, in response to the query result including a query failure indication, no re-authentication-authorization on the AI network function.

Optionally, in some examples of this disclosure, the device is further configured to:

establish, in response to the query result including the AMF ID, a connection with a corresponding AMF based on the AMF ID; and send a re-authentication-authorization message to the AMF, where the re-authentication-authorization message is indicative of that the NSSAAF performs the re-authentication-authorization on the AI network function.

Optionally, in some examples of this disclosure, the re-authentication-authorization request further includes a re-authentication parameter corresponding to the re-authentication-authorization, and the above-mentioned processing module 1902 is further configured to:

perform the re-authentication-authorization on the AI network function based on the re-authentication parameter.

Optionally, in some examples of this disclosure, in response to performing re-authentication-authorization on the AI network function, the device is further configured to:

send an authentication result to the UDM, where the authentication result includes parameter information after performing the re-authentication-authorization on the AI network function.

Optionally, in some examples of this disclosure, the device is further configured to:

send a re-authentication-authorization response to the AAA-S network element, where the re-authentication-authorization response is indicative of whether the NSSAAF network element performs the re-authentication-authorization on the AI network function.

Optionally, in some examples of this disclosure, the device is further configured to:

send an AAA re-authentication-authorization response to the AAA-S network element, where the AAA re-authentication-authorization response is indicative of whether the NSSAAF network element performs the re-authentication-authorization on the AI network function.

Optionally, in some examples of this disclosure, the device is further configured to:

transmit an AAA re-authentication-authorization response transparently to the AAA-S network element through an AAA-P network element, where the AAA re-authentication-authorization response is indicative of whether the NSSAAF network element performs the re-authentication-authorization on the AI network function.

Figure 20:
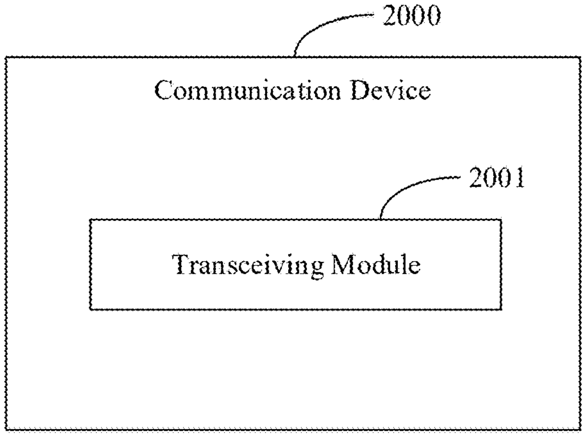
FIG. 20 is a schematic structural diagram of a communication device according to one or more examples of this disclosure.

FIG. 20 is a schematic structural diagram of a communication device according to some examples of this disclosure. As shown in FIG. 20, the device may include:

a transceiver module 2001, configured to send a re-authentication-authorization request to an NSSAAF network element, where the re-authentication-authorization request includes AIFSAI and a first identifier used to identify a UE served by the AI network function.

To sum up, in the communication device according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Optionally, in some examples of this disclosure, the above-mentioned transceiver module 2001 is further configured to:

send an AAA re-authentication-authorization request to the NSSAAF network element, where the AAA re-authentication-authorization request includes the AIFSAI and the first identifier.

Optionally, in some examples of this disclosure, the configuration module is further configured to:

transmit an AAA re-authentication-authorization request transparently to the NSSAAF network element through an AAA-P network element, where the AAA re-authentication-authorization request includes the AIFSAI and the first identifier.

Optionally, in some examples of this disclosure, the AIFSAI includes a second identifier used to identify the AI network function.

Optionally, in some examples of this disclosure, the device is further configured to:

receive a re-authentication-authorization response sent by the NSSAAF network element, where the re-authentication-authorization response is used to indicate whether the NSSAAF network element performs the re-authentication-authorization on the AI network function.

Optionally, in some examples of this disclosure, the device is further configured to:

receive an AAA re-authentication-authorization response sent by the NSSAAF network element, where the AAA re-authentication-authorization response is used to indicate whether the NSSAAF network element performs the re-authentication-authorization on the AI network function.

Optionally, in some examples of this disclosure, the device is further configured to:

receive an AAA re-authentication-authorization response transparently transmitted by the NSSAAF network element through an AAA-P network element, where the AAA re-authentication-authorization response is used to indicate whether the NSSAAF network element performs the re-authentication-authorization on the AI network function.

Figure 21:
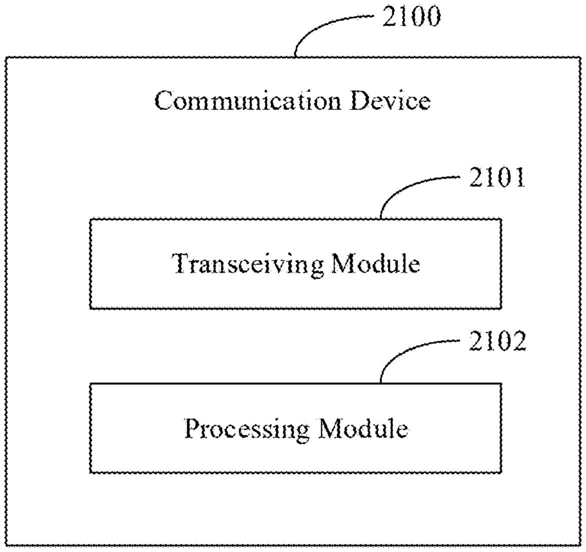
FIG. 21 is a schematic structural diagram of a communication device according to one or more examples of this disclosure.

FIG. 21 is a schematic structural diagram of a communication device according to some examples of this disclosure. As shown in FIG. 21, the device may include:

a transceiver module 2101, configured to receive a query request sent by an NSSAAF network element, where the query request includes AIFSAI and a first identifier used to identify a UE served by the AI network function; and a processing module 2102, configured to perform a query based on the AIFSAI and the first identifier, and send a query result to the NSSAAF network element.

To sum up, in the communication device according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Optionally, in some examples of this disclosure, the AIFSAI includes a second identifier used to identify the AI network function, and the above processing module 2102 is further configured to:

query whether the second identifier is present in the UDM;

in response to presence of the second identifier in the UDM, query, based on the first identifier, an AMF ID of a currently serving AMF of the UE corresponding to the first identifier, and send the AMF ID to the NSSAAF network element; and in response to absence of the second identifier in the UDM, send a query failure indication to the NSSAAF network element.

Optionally, in some examples of this disclosure, in response to the query result including the AMF ID, the above device is further configured to:

receive an authentication result sent by the NSSAAF network element, where the authentication result includes parameter information after re-authentication-authorization of the AI network function;

update a parameter of the AI network function based on the authentication result.

Figure 22:
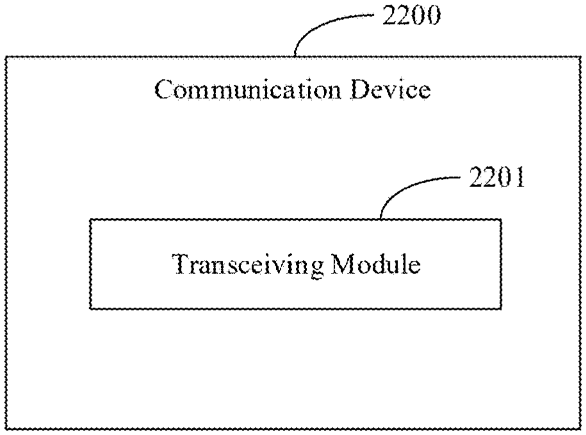
FIG. 22 is a schematic structural diagram of a communication device according to one or more examples of this disclosure.

FIG. 22 is a schematic structural diagram of a communication device according to some examples of this disclosure. As shown in FIG. 22, the device may include:

a transceiver module 2201, configured to receive a re-authentication-authorization message sent by an NSSAAF network element, where the re-authentication-authorization message is used to indicate that the NSSAAF performs re-authentication-authorization on the AI network function.

To sum up, in the communication device according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Optionally, in some examples of this disclosure, the above device is further configured to:

transmit the re-authentication-authorization message transparently to a UE through a base station.

Figure 23:
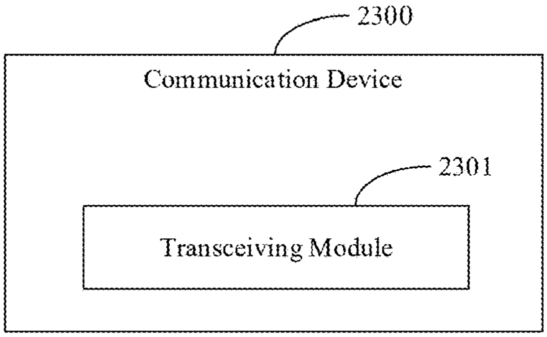
FIG. 23 is a schematic structural diagram of a communication device according to one or more examples of this disclosure.

FIG. 23 is a schematic structural diagram of a communication device according to some examples of this disclosure. As shown in FIG. 23, the device may include:

a transceiver module 2301, configured to receive a re-authentication-authorization message sent by an NSSAAF network element, where the re-authentication-authorization message is used to indicate that the NSSAAF performs re-authentication-authorization on the AI network function.

To sum up, in the communication device according to some examples of this disclosure, the NSSAAF network element receives the re-authentication-authorization request sent by the AAA-S network element, where the re-authentication-authorization request includes the AIFSAI and the first identifier used to identify the UE served by the AI network function. Subsequently, the NSSAAF network element performs re-authentication-authorization on the AI network function based on the AIFSAI and the first identifier. It can be seen that this disclosure provides a re-authentication-authorization method for AI network function(s), which can be used to perform re-authentication-authorization on AI network function(s), thereby ensuring the security of the AI network function(s) and enabling the AI network function(s) to provide UEs with safe and stable service.

Figure 24:
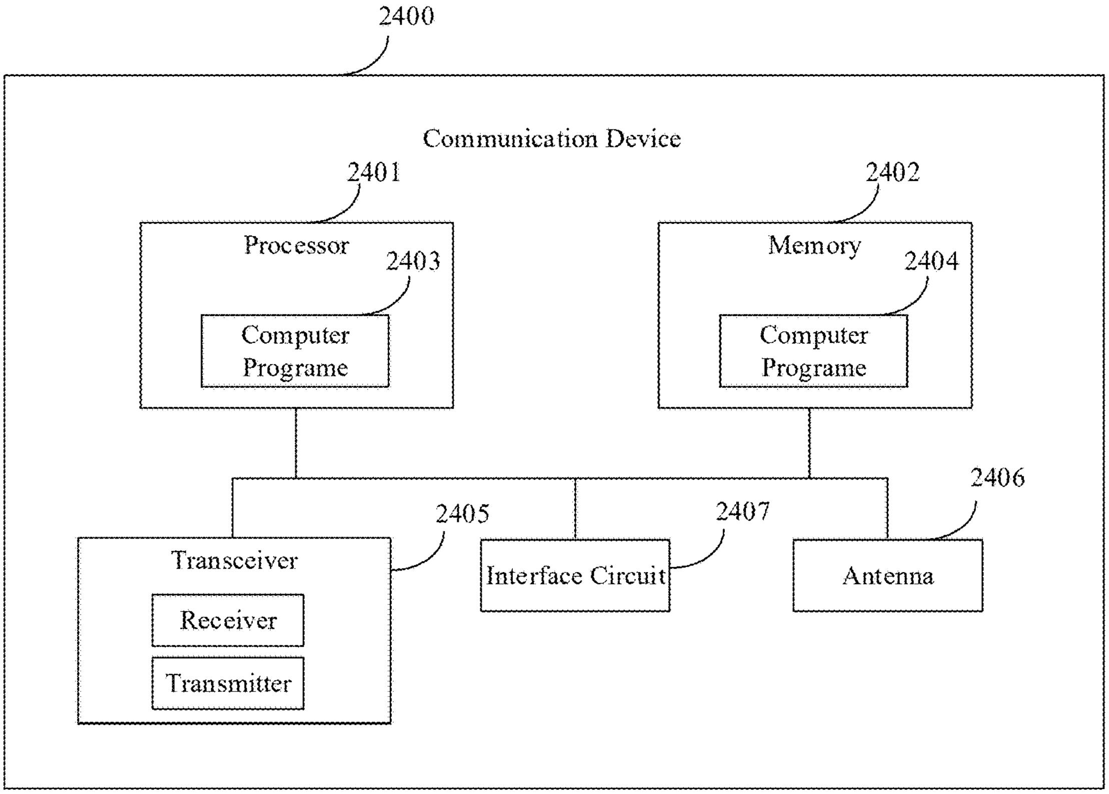
FIG. 24 is a block diagram of UE according to one or more examples of this disclosure.

Referring to FIG. 24, it is a schematic structural diagram of a communication device 2400 according to some examples of the present application. The communication device 2400 may be a network device, a terminal device; or may be a chip, a chip system, or a processor that supports a network device to implement the above method; or may be a chip, a chip system, or a processor that supports a terminal device to implement the above method. The device can be configured to implement the method described in the above method examples. For details, the description in the above method examples can be referred to.

The communication device 2400 may include one or more processors 2401. The processor 2401 may be a general-purpose processor or a special-purpose processor, or the like. For example, it can be a baseband processor or a central processing unit. The baseband processor can be configured to process communication protocols and communication data. The central processor can be configured to control communication devices (such as base stations, baseband chips, terminal devices, terminal device chips, DU or CU, etc.), execute computer programs, and processing data of computer programs.

Optionally, the communication device 2400 may further include one or more memories 2402, on which a computer program 2404 may be stored. The processor 2401 executes the computer program 2404, thereby causing the communication device 2400 to perform the steps described in the above method examples. Optionally, the memory 2402 may also store data. The communication device 2400 and the memory 2402 can be provided separately or integrated together.

Optionally, the communication device 2400 may further include a transceiver 2405 and an antenna 2406. The transceiver 2405 may be called a transceiver unit, a transceiver, a transceiver circuit, or the like, and is configured to implement transceiving functions. The transceiver 2405 may include a receiver and a transmitter. The receiver may be called a receiver, a receiving circuit, or the like, and is configured to implement the receiving function; the transmitter may be called a transmitter, a transmitting circuit, or the like, and is configured to implement the transmitting function.

Optionally, the communication device 2400 may further include one or more interface circuits 2407. The interface circuit 2407 is configured to receive code instructions and transmit them to the processor 2401. The processor 2401 executes the code instructions, thereby causing the communication device 2400 to perform the method described in the above method examples.

The communication device 2400 may be an NSSAAF network element. The transceiver 2405 is configured to perform step 201 in FIG. 2; step 301 to step 303 in FIG. 3; step 401 to step 403 in FIG. 4; step 501 to step 503 and step 505 in FIG. 5; step 601 to step 603 and step 605 in FIG. 6; step 701 to step 703 and step 705 in FIG. 7; step 801 to step 803 and step 805 in FIG. 8. The processor 2401 is configured to execute step 202 in FIG. 2; step 304 in FIG. 3; step 404 in FIG. 4; step 504 in FIG. 5; step 604 in FIG. 6; step 704 in FIG. 7; FIG. 8 Step 804.

The communication device 2400 may be an AMF network element. The transceiver 2405 is configured to perform step 1501 in FIG. 15; step 1601 to step 1602 in FIG. 16.

The communication device 2400 may be an AAA-S network element. The transceiver 2405 is configured to perform step 901 in FIG. 9; step 1001 to step 1002 in FIG. 10. The processor 2401 is configured to execute step 504 in FIG. 5.

The communication device 2400 may be a UDM. The transceiver 2405 is configured to perform step 1101 in FIG. 11; step 1201 in FIG. 12; step 1301 and step 1303 in FIG. 13; step 1401 and step 1403 in FIG. 14. The processor 2401 is configured to execute step 1102 in FIG. 11; step 1202 in FIG. 12; step 1302 in FIG. 13; step 1402 and step 1404 in FIG. 14.

The communication device 2400 may be a terminal device. The transceiver 2405 is configured to perform step 1701 in FIG. 17.

In an exemplary implementation, the processor 2401 may include a transceiver for implementing receiving and transmitting functions. For example, the transceiver may be a transceiver circuit, an interface, or an interface circuit. The transceiver circuits, interfaces or interface circuits configured to implement the receiving and transmitting functions can be provided separately or integrated together. The above-mentioned transceiver circuit, interface or interface circuit can be used for reading and writing codes/data, or the above-mentioned transceiver circuit, interface or interface circuit can be used for signal transmission or transfer.

In an exemplary implementation, the processor 2401 may store a computer program 2403, and the computer program 2403 runs on the processor 2401, causing the communication device 2400 to perform the method described in the above method examples. The computer program 2403 may be solidified in the processor 2401, in which case the processor 2401 may be implemented by hardware.

In an exemplary implementation, the communication device 2400 may include a circuit, which may implement the functions of sending or receiving or communicating in the foregoing method examples. The processor and transceiver described in this application can be implemented in integrated circuits (ICs), analog ICs, radio frequency integrated circuits (RFICs), mixed signal ICs, application specific integrated circuits (ASICs), printed circuit boards (PCBs), electronic equipment, and the like. The processor and transceiver can also be manufactured using various IC process technologies, such as complementary metal oxide semiconductor (CMOS), n-type metal oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), and the like.

The communication device described in the above examples may be a network device or a terminal device, but the scope of the communication device described in this application is not limited thereto, and the structure of the communication device may not be limited by FIG. 24. The communication device may be a stand-alone device or may be part of a larger device. For example, the communication device may be:

(1) an independent IC, a chip, a chip system, or a subsystem;

(2) a collection of one or more ICs; optionally, the IC collection may further include storage components for storing data and computer programs;

(3) ASIC, such as modem;

(4) a module that can be embedded in other devices;

(5) a receiver, a terminal device, an intelligent terminal device, a cellular phone, a wireless device, a handheld device, a mobile unit, a vehicle-mounted device, a network device, a cloud device, an artificial intelligence device, or the like; and (6) others.

Figure 25:
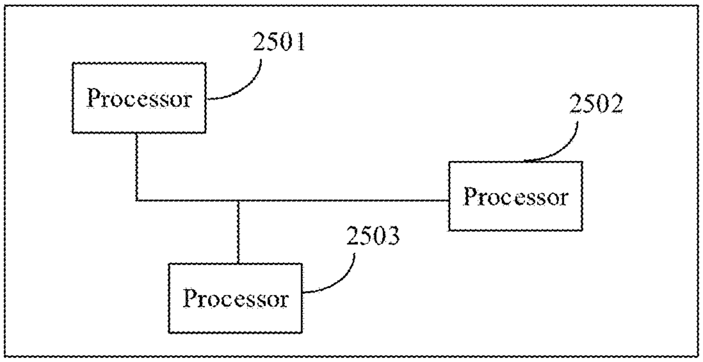
FIG. 25 is a block diagram of a network-side device according to one or more examples of this disclosure.

For the case where the communication device may be a chip or a chip system, a schematic structural diagram of the chip shown in FIG. 25 can be referred to. The chip shown in FIG. 25 includes a processor 2501 and an interface 2502. The number of processors 2501 may be one or more, and the number of interfaces 2502 may be multiple.

Optionally, the chip also includes a memory 2503, which is configured to store necessary computer programs and data.

Those skilled in the art can also understand that the various illustrative logical blocks and steps listed in the examples of this application can be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as exceeding the protection scope of the examples of the present application.

This application further provides a readable storage medium on which instructions are stored. When the instructions are performed by a computer, the functions of any of the above method examples are implemented.

This application further provides a computer program product, which, when performed by a computer, implements the functions of any of the above method examples.

In the above examples, it may be implemented in whole or in part by software, hardware, firmware, or any combination thereof. When implemented using software, it may be implemented in whole or in part in the form of a computer program product. The computer program product includes one or more computer programs. When the computer program is loaded and performed on a computer, the processes or functions described in the examples of the present application are generated in whole or in part. The computer may be a general-purpose computer, a special-purpose computer, a computer network, or other programmable device. The computer program may be stored in or transferred from one computer-readable storage medium to another, for example, the computer program may be transferred from a website, computer, server, or data center to another website, computer, server or data center through wired (such as coaxial cable, optical fiber, digital subscriber line (DSL)) or wireless (such as infrared, wireless, microwave, etc.) means. The computer-readable storage medium may be any available medium that can be accessed by a computer or a data storage device such as a server, data center, etc. that contains one or more available medium integrated. The usable medium may be magnetic medium (e.g., floppy disks, hard disks, magnetic tapes), optical medium (e.g., high-density digital video discs (DVD)), semiconductor medium (e.g., solid state disks (SSD)), or the like.

Those of ordinary skill in the art can understand that the first, second, and other numerical numbers involved in this application are only for convenience of description and are not intended to limit the scope of the examples of this application, but may also indicate the order.

"At least one" in this application can also be described as one or more, and "a plurality of" can be two, three, four or more, which is not limited by this application. In the examples of this application, for a technical feature, the technical feature is distinguished by "first", "second", "third", "A", "B", "C" and "D", etc. The technical features described in "first", "second", "third", "A", "B", "C" and "D" are in no particular order or sequence.

The corresponding relationships shown in each table in this application can be configured or predefined. The values of the information in each table are only examples and can be configured as other values, which are not limited by this application. When configuring the correspondence between information and each parameter, it is not necessarily required to configure all the correspondences shown in each table. For example, in the table in this application, the corresponding relationships shown in some rows may not be configured. For another example, appropriate deformation adjustments can be made based on the above table, such as splitting, merging, etc. The names of the parameters shown in the titles of the above tables may also be other names understandable by the communication device, and the values or expressions of the parameters may also be other values or expressions understandable by the communication device. When implementing the above tables, other data structures can also be used, such as arrays, queues, containers, stacks, linear lists, pointers, linked lists, trees, graphs, structures, classes, heaps, hash, hash tables, or the like.

Predefinition in this application can be understood as definition, pre-definition, storage, pre-storage, pre-negotiation, pre-configuration, solidification, or pre-burning.

Those of ordinary skill in the art will appreciate that the units and algorithm steps of each example described in conjunction with the examples disclosed herein can be implemented with electronic hardware, or a combination of computer software and electronic hardware. Whether these functions are performed in hardware or software depends on the specific application and design constraints of the technical solution. Those of ordinary skill in the art may implement the described functionality using different methods for each specific application, but such implementations should not be considered beyond the scope of this application.

Those of ordinary skill in the art can clearly understand that for the convenience and simplicity of description, the specific working processes of the systems, devices and modules described above can be referred to the corresponding processes in the foregoing method examples, and will not be described again here.

The above are only specific examples of the present application, but the protection scope of the present application is not limited thereto. Those of ordinary skill in the art can easily think of changes or substitutions within the technical scope disclosed in the present application, which should be covered by the protection scope of this application. Therefore, the protection scope of this application should be subject to the protection scope of the claims.

What is claimed is:

1. A re-authentication-authorization method for an artificial intelligence (AI) network function, comprising:

receiving a re-authentication-authorization request sent by an authentication and authorization server (AAA-S) network element, wherein the re-authentication-authorization request comprises AI function selection assistance information (AIFSAI) and a first identifier used for identifying a user equipment (UE) served by the AI network function; and performing, by a network slice-specific authentication and authorization function (NSSAAF) network element, re-authentication-authorization on the AI network function based on the AIFSAI and the first identifier;

wherein the AIFSAI comprises a second identifier used for identifying the AI network function;

wherein performing the re-authentication-authorization on the AI network function based on the AIFSAI and the first identifier comprises:

sending a query request to a unified data management function (UDM), wherein the query request comprises the AIFSAI and the first identifier;

receiving a query result sent by the UDM;

determining whether to perform the re-authentication-authorization on the AI network function based on the query result; and performing, in response to the query result comprising an access and mobility management function (AMF) identifier (ID), the re-authentication-authorization on the AI network function; and performing, in response to the query result comprising a query failure indication, no re-authentication-authorization on the AI network function.

2. The method of claim 1, wherein receiving the re-authentication-authorization request sent by the AAA-S network element comprises:

receiving an authentication and authorization (AAA) re-authentication-authorization request sent by the AAA-S network element, wherein the AAA re-authentication-authorization request comprises the AIFSAI and the first identifier; or receiving an AAA re-authentication-authorization request transparently transmitted by the AAA-S network element through an authentication and authorization proxy (AAA-P) network element, wherein the AAA re-authentication-authorization request comprises the AIFSAI and the first identifier.

3. The method of claim 1, further comprising:

establishing, in response to the query result comprising the AMF ID, a connection with a corresponding AMF based on the AMF ID; and sending a re-authentication-authorization message to the AMF, wherein the re-authentication-authorization message is indicative of that the NSSAAF performs the re-authentication-authorization on the AI network function.

4. The method of claim 1, wherein the re-authentication-authorization request further comprises a re-authentication parameter corresponding to the re-authentication-authorization; and performing the re-authentication-authorization on the AI network function comprises:

performing the re-authentication-authorization on the AI network function based on the re-authentication parameter.

5. The method of claim 1, wherein in response to performing the re-authentication-authorization on the AI network function, the method further comprises:

sending an authentication result to the UDM, wherein the authentication result comprises parameter information after performing the re-authentication-authorization on the AI network function.

6. The method of claim 1, further comprising:

sending a re-authentication-authorization response to the AAA-S network element, wherein the re-authentication-authorization response is indicative of whether the NSSAAF network element performs the re-authentication-authorization on the AI network function.

7. The method of claim 6, wherein sending the re-authentication-authorization response to the AAA-S network element comprises:

sending an AAA re-authentication-authorization response to the AAA-S network element, wherein the AAA re-authentication-authorization response is indicative of whether the NSSAAF network element performs the re-authentication-authorization on the AI network function; or transmitting an AAA re-authentication-authorization response transparently to the AAA-S network element through an AAA-P network element, wherein the AAA re-authentication-authorization response is indicative of whether the NSSAAF network element performs the re-authentication-authorization on the AI network function.

8. A re-authentication-authorization method for an artificial intelligence (AI) network function, comprising:

sending a re-authentication-authorization request to a network slice-specific authentication and authorization function (NSSAAF) network element, wherein the re-authentication-authorization request comprises AI function selection assistance information (AIFSAI) and a first identifier used for identifying a user equipment (UE) served by the AI network function;

wherein the AIFSAI comprises a second identifier used for identifying the AI network function;

the re-authentication-authorization request is used for indicating that the NSSAAF performs re-authentication-authorization on the AI network function based on the AIFSAI and the first identifier, by performing the following steps: sending a query request to a unified data management function (UDM), wherein the query request comprises the AIFSAI and the first identifier; receiving a query result sent by the UDM; determining whether to perform the re-authentication-authorization on the AI network function based on the query result; and performing, in response to the query result comprising an access and mobility management function (AMF) identifier (ID), the re-authentication-authorization on the AI network function; and performing, in response to the query result comprising a query failure indication, no re-authentication-authorization on the AI network function.

9. The method of claim 8, wherein sending the re-authentication-authorization request to the NSSAAF network element comprises:

sending an authentication and authorization (AAA) re-authentication-authorization request to the NSSAAF network element, wherein the AAA re-authentication-authorization request comprises the AIFSAI and the first identifier; or transmitting an AAA re-authentication-authorization request transparently to the NSSAAF network element through an authentication and authorization proxy (AAA-P) network element, wherein the AAA re-authentication-authorization request comprises the AIFSAI and the first identifier.

10. The method of claim 8, further comprising:

receiving a re-authentication-authorization response sent by the NSSAAF network element, wherein the re-authentication-authorization response is indicative of whether the NSSAAF network element performs the re-authentication-authorization on the AI network function.

11. The method of claim 10, wherein receiving the re-authentication-authorization response sent by the NSSAAF network element comprises:

receiving an AAA re-authentication-authorization response sent by the NSSAAF network element, wherein the AAA re-authentication-authorization response is indicative of whether the NSSAAF network element performs the re-authentication-authorization on the AI network function; or receiving an AAA re-authentication-authorization response transparently transmitted by the NSSAAF network element through an AAA-P network element, wherein the AAA re-authentication-authorization response is indicative of whether the NSSAAF network element performs the re-authentication-authorization on the AI network function.

12. A re-authentication-authorization method for an artificial intelligence (AI) network function, comprising:

receiving, by a unified data management function (UDM), a query request sent by a network slice-specific authentication and authorization function (NSSAAF) network element, wherein the query request comprises AI function selection assistance information (AIFSAI) and a first identifier used for identifying a user equipment (UE) served by the AI network function; and performing, by the UDM, a query based on the AIFSAI and the first identifier, and sending a query result to the NSSAAF network element;

wherein the AIFSAI comprises a second identifier used for identifying the AI network function; and performing the query based on the AIFSAI and the first identifier, and sending the query result to the NSSAAF network element comprises:

querying whether the second identifier is present in the UDM;

in response to presence of the second identifier in the UDM, querying, based on the first identifier, an access and mobility management function (AMF) identifier (ID) of a currently serving AMF of the UE corresponding to the first identifier, and sending the AMF ID to the NSSAAF network element; and in response to absence of the second identifier in the UDM, sending a query failure indication to the NSSAAF network element.

13. The method of claim 12, wherein in response to the query result comprising an AMF ID, the method further comprises:

receiving an authentication result sent by the NSSAAF network element, wherein the authentication result comprises parameter information after re-authentication-authorization of the AI network function; and updating a parameter of the AI network function based on the authentication result.

* * * * *